(12) United States Patent
Uesaka et al.

(10) Patent No.: US 9,357,200 B2
(45) Date of Patent: May 31, 2016

(54) VIDEO PROCESSING DEVICE AND VIDEO PROCESSING METHOD

(75) Inventors: Yasushi Uesaka, Hyogo (JP); Hiroshi Yahata, Osaka (JP); Wataru Ikeda, Osaka (JP); Tomoki Ogawa, Osaka (JP); Yuka Ozawa, Osaka (JP); Toru Kawaguchi, Tokyo (JP)

(73) Assignee: PANASONIC INTELECTUAL PROPERTY MANAGEMENT CO., LTD., Osaka (JP)

( * ) Notice: Subject to any disclaimer, the term of this patent is extended or adjusted under 35 U.S.C. 154(b) by 313 days.

(21) Appl. No.: 14/005,406

(22) PCT Filed: Apr. 26, 2012

(86) PCT No.: PCT/JP2012/002873
§ 371 (c)(1),
(2), (4) Date: Sep. 16, 2013

(87) PCT Pub. No.: WO2012/147354
PCT Pub. Date: Nov. 1, 2012

(65) Prior Publication Data
US 2014/0002621 A1   Jan. 2, 2014

Related U.S. Application Data

(60) Provisional application No. 61/479,949, filed on Apr. 28, 2011, provisional application No. 61/497,579, filed on Jun. 16, 2011.

(51) Int. Cl.
*H04N 13/04* (2006.01)
*H04N 13/00* (2006.01)
(Continued)

(52) U.S. Cl.
CPC ......... *H04N 13/007* (2013.01); *H04N 13/0062* (2013.01); *H04N 13/0066* (2013.01);
(Continued)

(58) Field of Classification Search
None
See application file for complete search history.

(56) References Cited

U.S. PATENT DOCUMENTS

2002/0118952 A1   8/2002   Nakajima et al.
2005/0089212 A1   4/2005   Mashitani et al.
(Continued)

FOREIGN PATENT DOCUMENTS

CN   1643939 A   7/2005
CN   1698370 A   11/2005
(Continued)

OTHER PUBLICATIONS

Office Action issued Mar. 30, 2015 in corresponding Chinese Patent Application No. 201280020386.1 (with English translation of Search Report).
(Continued)

*Primary Examiner* — James M Anderson, II
(74) *Attorney, Agent, or Firm* — Wenderoth, Lind & Ponack, L.L.P.

(57) ABSTRACT

A video processing device overlays appropriate presentation data over video images, even if the size of the display area for 3D video images differs from the size of the display area for presentation data that is to be presented with the 3D video images. The video processing device generates left- and right-view images from a 3D video stream, enlarges presentation data obtained from a relevant data stream to scale its display size to match the display size of video images, applying an offset value, which is determined to cause a specific parallax, to the thus enlarged presentation data to generate left- and right-view presentation data, and overlays the left-view presentation data over the left-view images and the right-view presentation data over the right-view images to display video images resulting from the overlaying.

4 Claims, 34 Drawing Sheets

+Offset value

−Offset value

Left-view screen (left-view caption)

Right-view screen (right-view caption)

(51) Int. Cl.
*H04N 21/431* (2011.01)
*H04N 21/488* (2011.01)
*H04N 21/81* (2011.01)
*H04N 21/236* (2011.01)
*H04N 21/2368* (2011.01)

(52) U.S. Cl.
CPC ..... *H04N21/2368* (2013.01); *H04N 21/23614* (2013.01); *H04N 21/4312* (2013.01); *H04N 21/4884* (2013.01); *H04N 21/816* (2013.01); *H04N 2213/003* (2013.01)

(56) References Cited

U.S. PATENT DOCUMENTS

| | | | |
|---|---|---|---|
| 2006/0165387 A1 | 7/2006 | Itoh et al. | |
| 2009/0310021 A1 | 12/2009 | Kondo et al. | |
| 2010/0220175 A1* | 9/2010 | Claydon | H04N 9/8715 348/43 |
| 2010/0265315 A1 | 10/2010 | Okuda et al. | |
| 2011/0033170 A1 | 2/2011 | Ikeda et al. | |
| 2011/0119709 A1* | 5/2011 | Kim | H04N 13/004 725/39 |
| 2011/0268196 A1* | 11/2011 | Suh | H04N 13/0048 375/240.26 |
| 2012/0287127 A1 | 11/2012 | Ikeda et al. | |
| 2012/0293614 A1 | 11/2012 | Ikeda et al. | |
| 2012/0320155 A1* | 12/2012 | Suh | H04N 13/0018 348/43 |

FOREIGN PATENT DOCUMENTS

| | | |
|---|---|---|
| JP | 2010-021991 | 1/2010 |
| JP | 2010-246157 | 10/2010 |
| JP | 4588120 | 11/2010 |
| JP | 2010-273333 | 12/2010 |
| JP | 2011-035858 | 2/2011 |
| JP | 2011-071770 | 4/2011 |

OTHER PUBLICATIONS

International Search Report issued Jul. 17, 2012 in corresponding International Application No. PCT/JP2012/002873.

\* cited by examiner

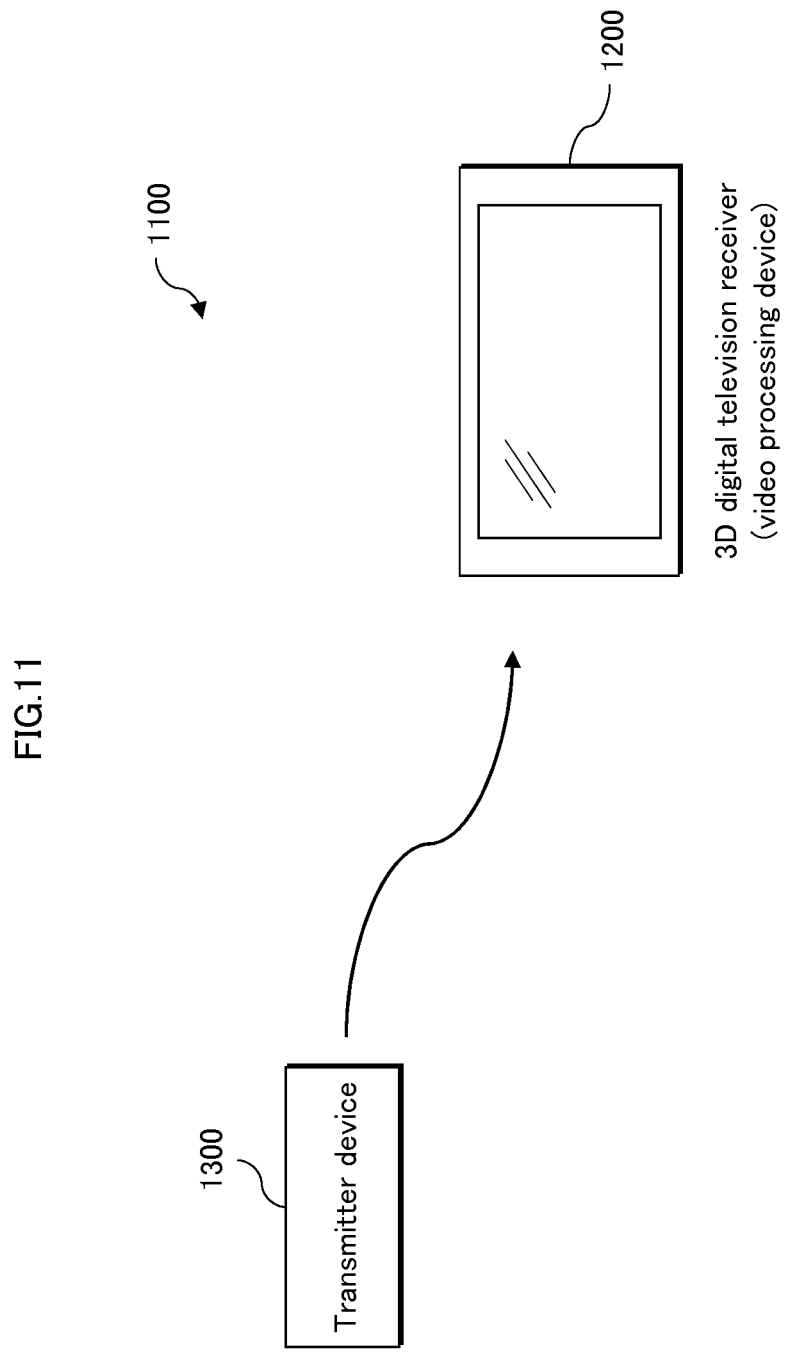

FIG.14

Video offset information

| Data construction | Number of bit | Bit string notation |
|---|---|---|
| offset_metadata() {<br>  number_of_offset_sequences<br>  for (offset_sequence_id = 0;<br>       offset_sequence_id < umber_of_offset_sequences;<br>       offset_sequence_id++) {<br>    offset_sequence() {<br>      offset_direction_flag<br>      offset_value (offset value)<br>    }<br>  }<br>} | 8<br><br><br><br><br><br>1<br>7 | uimsbf<br><br><br><br><br><br>bslbf<br>uimsbf |

Offset information (of corresponding picture)

Offset sequence #1 ( offset_sequence_id = 0 )
Offset sequence #2 ( offset_sequence_id = 1 )
Offset sequence #3 ( offset_sequence_id = 2 )
Offset sequence #4 ( offset_sequence_id = 3 )
...

FIG.16A

Data unit definition for offset reference information

Data unit

| Data construction | Number of bits | Bit string notation |
|---|---|---|
| data_unit() {<br>  unit_separator<br>  data_unit_parameter<br>  data_unit_size<br>  for (i=0; i<data_unit_size; i++) {<br>    data_unit_data_byte<br>  }<br>} | 8<br>8<br>24<br><br><br>8 | uimsbf<br>uimsbf<br>uimsbf<br><br><br>bslbf | data_unit_parameter: Types of data unit

| Data unit | Data unit parameter | Function |
|---|---|---|
| Statement body | 0x20 | Character data composing caption statement is transmitted. Setting data of display area etc in caption management is transmitted. |
| Geometric | 0x28 | Geometric graphics data is transmitted. |
| Additional sound | 0x2c | Additional sound information is transmitted. |
| 1-byte DRCS | 0x30 | 1-byte DRCS graphics data is transmitted. |
| 2-byte DRCS | 0x31 | 2-byte DRCS graphics data is transmitted. |
| Color map | 0x34 | Color map data is transmitted. |
| Bit map | 0x35 | Bit map data is transmitted. |
| *Offset reference information* | *0x38* | *Offset reference information is transmitted.* |

FIG.16B

Data unit definition for offset reference information

Offset reference information — D100

| Type information (D101) | Reference information (D102) |
|---|---|

Data unit for offset reference information

| Data construction | Number of bits | Bit string notation |
|---|---|---|
| Offset information () {<br>  offset_type<br>  reserved<br>  if (offset_type == '00') {<br>    fixed_offset_direction_flag<br>    fixed_offset_value<br>  }<br>  else if (offset_type == '01') {<br>    offset_sequence_id_ref<br>  }<br>  else {<br>    reserved<br>  }<br>} | <br>2<br>6<br><br>1<br>7<br><br>8<br><br>8 | <br>bslbf<br>bslbf<br><br>bslbf<br>uimsbf<br><br>uimsbf<br><br>bslbf | offset_type: type of offset reference information

Types of offset reference information

| b2 | b1 | Types of offset information (Type information) |
|---|---|---|
| 0 | 0 | Fixed offset information (immediate) |
| 0 | 1 | Reference video offset information ID |
| 1 | 0 | Reserved |
| 1 | 1 | Reserved |

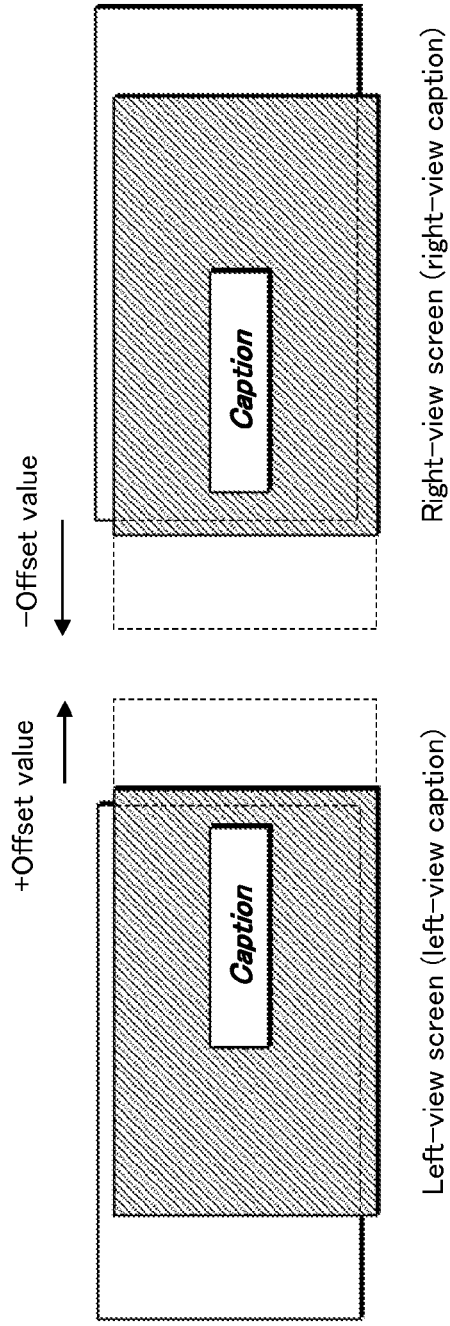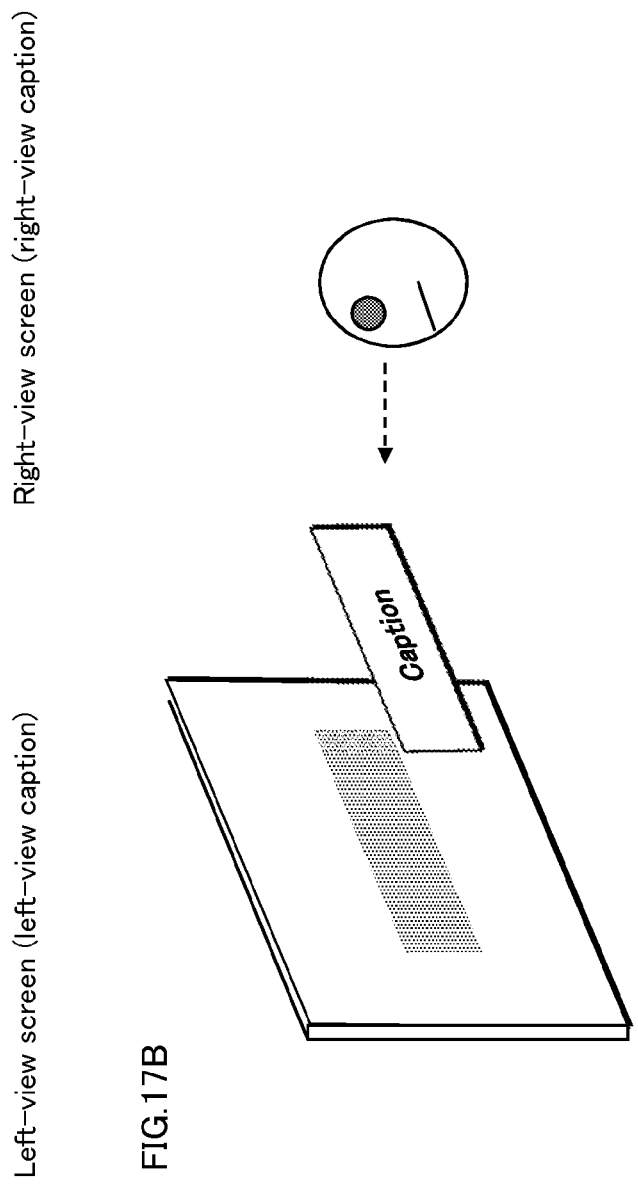
FIG.17A
FIG.17B

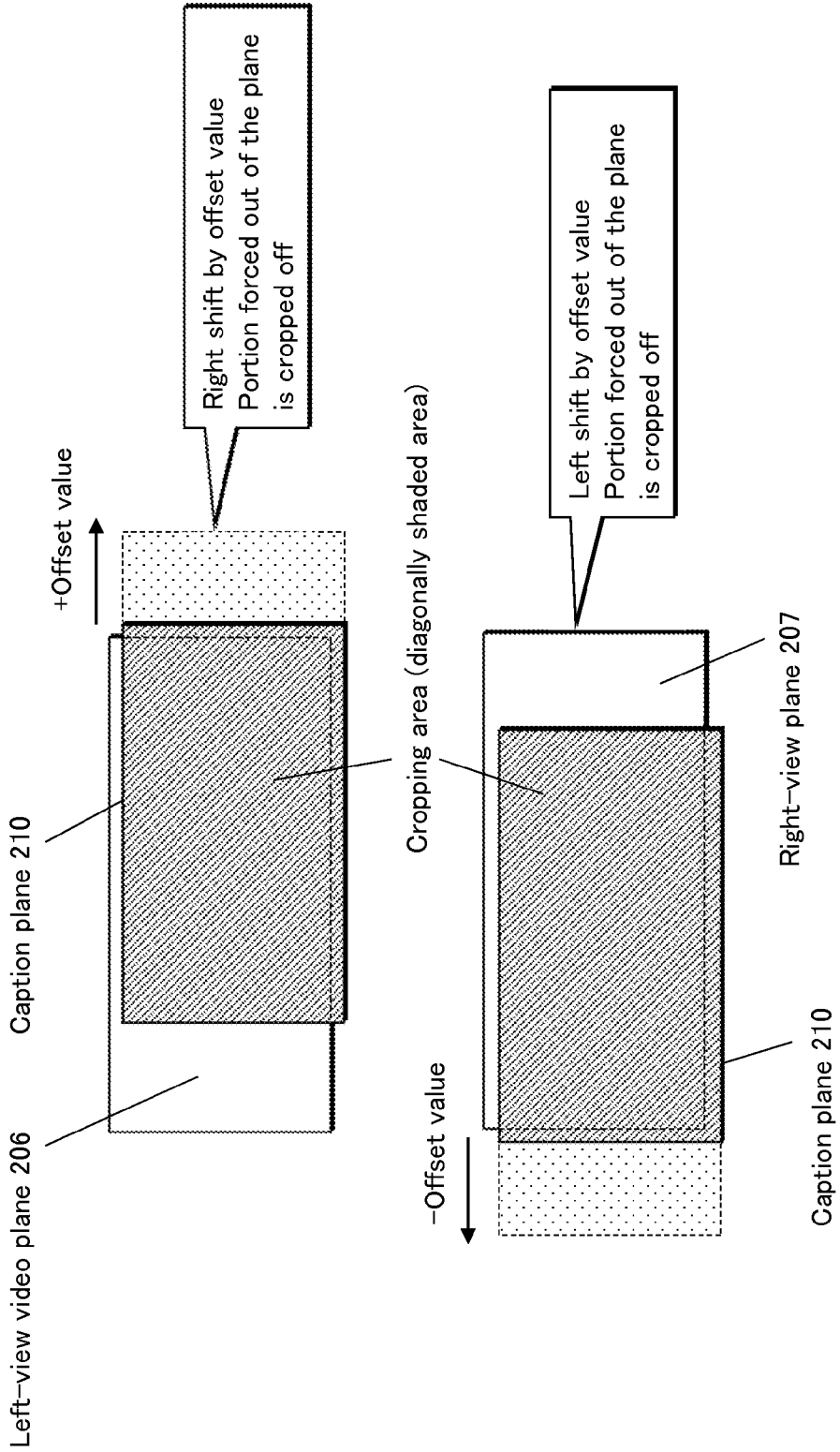

FIG.29

```
Data group
  data_group() {
    data_group_id
    data_group_version
    data_group_link_number
    last_data_group_link_number
    data_group_size
    for (i=0; i<N; i++) {
      data_group_data_byte
    }
    CRC_16
  }
``` data_group_id (Data group identifier: DGI):
Identify data group to distinguish between caption management data and caption stamen data

| Type of caption data | Data group identifier (DGI) | |
|---|---|---|
| | Set A | Set B |
| Caption management | 0x0 | 0x20 |
| Caption statement (1st language) | 0x1 | 0x21 |
| Caption statement (2nd language) | 0x2 | 0x22 |
| : | : | : |
| Caption statement (8th language) | 0x8 | 0x28 |
| *Caption statement for R (1st language)* | *0x41* | *0x61* |
| *Caption statement for R (2nd language)* | *0x42* | *0x62* |
| : | : | : |
| *Caption statement for R (8th language)* | *0x48* | *0x68* |

Use conventional data for 2D/L

Newly defined for R

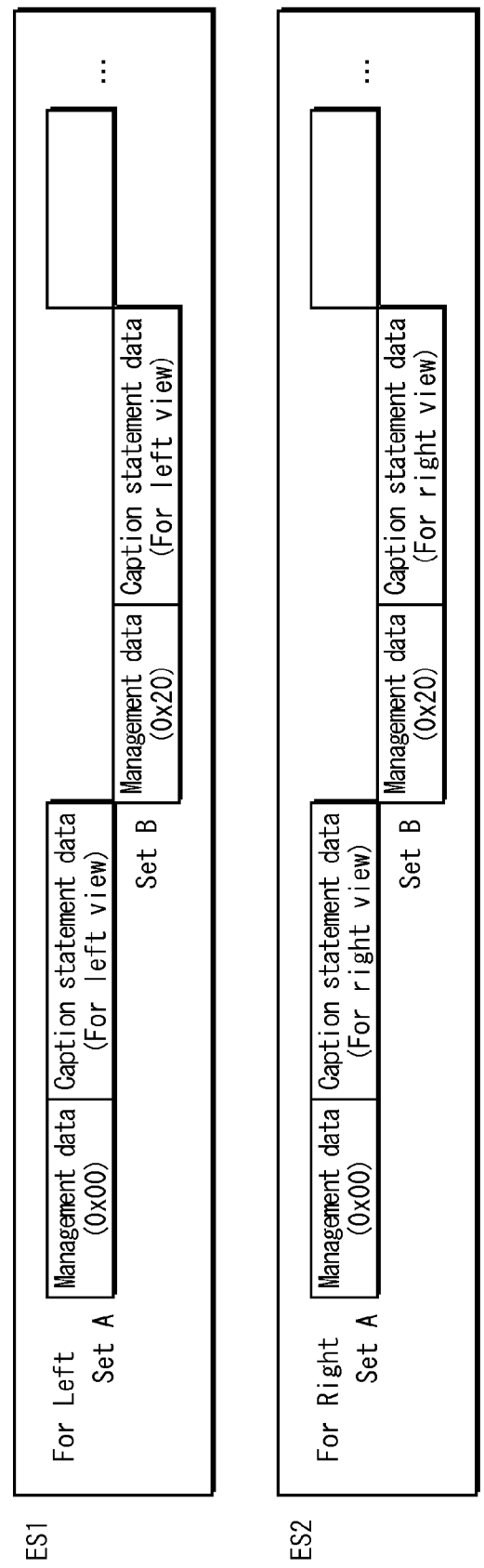

VIDEO PROCESSING DEVICE AND VIDEO PROCESSING METHOD

This application is the national stage of PCT/JP2012/002873, filed Apr. 26, 2012, which claims the benefit of U.S. Provisional Application No. 61/479,949, filed Apr. 28, 2011, and U.S. Provisional Application No. 61/497,579, filed Jun. 16, 2011.

TECHNICAL FIELD

The present invention relates to a technology for overlaying presentation data, which is to be displayed with 3D video images, over the 3D video images.

BACKGROUND ART

Recent years have seen an increase in the number of movie theaters capable of presenting stereoscopic display and thus offering opportunities to enjoy 3D video. Also, 3D television receivers and 3D players offering opportunities to watch 3D video as well as 2D video at homes are becoming widespread.

When the display screen of a display device is perceived as an X-Y plane, a 2D video image is an image presented by image pixels on this X-Y plane, and may also be referred to as a monoscopic image.

On the other hand, a 3D video is composed of images that add depth in the direction of the Z axis to the image pixels on the X-Y plane of the display screen of the display device. 3D video is viewed by the user through playback of the left-view images to be perceived by the left eye and the right-view images to be perceived by the right eye to produce the stereoscopic viewing effect.

With reference to pixels of a 3D video image, pixels having a positive Z-axis coordinate appear in the user's eye closer toward the user than the actual display screen of the display device, whereas pixels having a negative Z-axis coordinate appear further back than the display screen.

Here, the depth of captions (or subtitles) presented with 3D video images, such as a 3D movie production, needs to be adjusted in view of the degree of pop out of the 3D video images. Without the depth adjustment, captions may appear to stick out from the video images, or the captions may appear too far apart in depth direction from the video images.

In view of such problems, it is desirable to optimally adjust the depth or of the pop-out state of each caption or frame to make the captions appear slightly closer than the video images.

Patent Literature 1 and 2 listed below describe a conventional technology for optimally adjusting captions displayed on 3D video images to realize playback of superior quality stereoscopic images.

CITATION LIST

Patent Literature

[Patent Literature 1]
  Japanese Patent No. 4588120
[Patent Literature 2]
  Japanese Patent Application Publication No. 2010-246157

SUMMARY OF INVENTION

Technical Problem

Patent Literature 1 and 2 disclose a technology for displaying video images and caption statements in 3D from a recording medium. More specifically, Patent Literature 1 and 2 describe the details of a playback device for 3D video images which can assign an offset value to a caption plane for caption display, and shifting the caption plane to the left and right to generate parallax images for stereoscopic viewing. Patent Literature 1 and 2 describe the process of overlaying, on the assumption that the size (resolution) of the caption plane is the same as that of the video plane for video display.

However, the video plane size and the caption plane size are different in the specifications employed in the current broadcasting practice.

For this reason, the technologies disclosed in Patent Literature 1 and 2 are not directly applicable to the process of overlaying 3D images and captions.

In view of the above, the present invention aims to provide a video processing device and video processing method for overlaying appropriate presentation data over video images despite that the size of the display area for 3D video images differs from the size of the display area for presentation data that is to be presented with the 3D video images.

Solution to Problem

To achieve the aim described above, a video processing device includes: a receiving unit configured to receive a video stream of 3D video data and a data stream of presentation data to be overlaid over video images generated from the video stream, a display area for the presentation data differing in size from a display area for the video images; a video image generating unit configured to generate left-view images and right-view images from the video stream; an enlarging unit configured to enlarge the presentation data by a predetermined factor so as to scale a display area for the enlarged presentation data to match the display area for the video images; a data generating unit configured to generate left-view presentation data and right-view presentation data by using the enlarged presentation data and an offset value determined to cause a parallax between the left-view presentation data and the right-view presentation data; and a display processing unit configured to overlay the left-view presentation data over the left-view images and the right-view presentation data over the right-view images to display video images resulting from the overlaying.

Advantageous Effects of Invention

According to the construction described above, the video processing device enlarges the presentation data so that the size of the display area for the presentation data matches to the size of the display area for the video images and then generates left-view presentation data and right-view presentation data from the thus enlarged presentation data by using the offset value. This ensures that a pair of left- and right-view presentation data generated by applying the shift according to the offset value is suitably overlaid over the video images because the pair of presentation data produces the parallax to the extent originally intended.

BRIEF DESCRIPTION OF DRAWINGS

FIG. 11 shows the configuration of a video processing system 1100.

FIG. 14 illustrates the construction of video offset information.

FIG. 16A illustrates the definition of data unit for offset reference information, and FIG. 16B illustrates the construction of offset reference information.

FIG. 17A illustrates the parallax produced by a pair of captions presented using the offset value, and FIG. 17B illustrates the 3D display of the caption presented using the offset value.

FIG. 18 illustrates the process of overlaying a caption statement over a video image.

FIG. 29 illustrates that data group identifiers newly assigned to right-view captions.

FIG. 30 illustrates elementary streams each including a different one of a left-view caption stream and a right-view caption stream.

DESCRIPTION OF EMBODIMENTS

1. Findings Underlying the Present Invention

Figure 1:
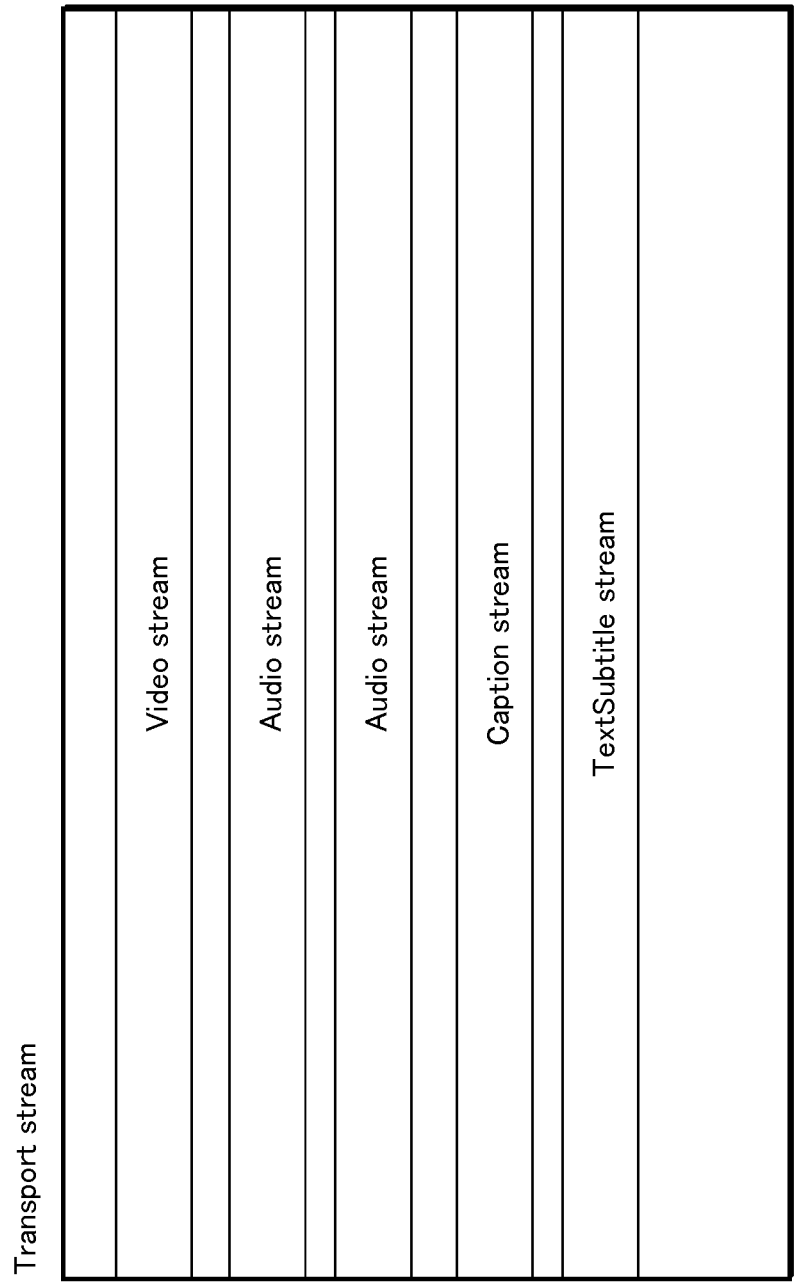
FIG. 1 illustrates an overview of a transport stream.

As described above, Patent Literature 1 and 2 each disclose a technology for overlaying video images with captions, on the assumption that the caption plane and the video plane are of the same size.

On the other hand, in the specifications for broadcasting, the caption plane and the video plane are assumed to have a different size. In broadcasting, the typical size of a video plane is 1920×1080 and the typical size of a caption plane is 960×540. Therefore, to overlay a caption over a video image, the caption on the caption plane needs to be enlarged both horizontally and vertically. More specifically, the caption is enlarged by doubling a single pixel vertically and horizontally (2×horizontal/vertical pixel expansion). Consequently, the single pixel is expanded vertically and horizontally to cover four pixels. Instead of simply duplicating the single pixel in each direction, the duplicated pixels may be adjusted to supplement or enlarge the caption character by using color information of the neighboring pixels. As a result of enlarging the caption plane at the time of overlaying, the caption plane is scaled to be equal in size to the video plane, so that the respective planes are overlaid appropriately.

The technologies disclosed in Patent Literature 1 and 2 are directed to overlying captions over 3D video images. Note that the captions are also displayed in 3D. To this end, a left-view caption and a right-view caption are generated from the caption plane respectively by adding and subtracting a predetermined value (offset value) in the x-axis direction. The thus generated left-view caption is overlaid over a left-view image, whereas the thus generated right-view caption is overlaid over right-view image. The offset value, expressed in the number of pixels, is used for generating a pair of parallax images for the left and right view.

The following considers the case where the technology disclosed in Patent Literature 1 or 2 are combined into the overlaying scheme currently employed in the broadcasting. In this case, a left-view caption and a right-view caption are generated from the caption plane by applying the offset value. The left- and right view captions are each enlarged before being overlaid over a left-view image and a right-view image, respectively. Although the offset value is appropriate, the captions having been enlarged involves an extra shift in the horizontal direction and therefore the resulting pair of captions differ from the parallax images originally intended. As a result, the captions cannot be correctly displayed in 3D. This may be addressed by determining the offset value in view of the enlarging process. This option, however, cannot render it possible to generate a pair of parallax images involving the shift corresponding to an odd number of pixels. It is because the amount of shift acquired through enlargement always corresponds to an even number of pixels.

The present inventors have recognized that mere application of the technologies disclosed in Patent Literature 1 and 2 to the current broadcasting specifications cannot make it possible to provide an offset value with the accuracy of one pixel unit. Then, through the intensive study, the present inventors have found that arranging the processing order makes it possible to overlay captions over video images as per the current broadcasting specifications to realize the originally intended 3D display. Based on the findings, the present inventors have arrived at the present invention.

One aspect of the present invention provides a video processing device that includes: a receiving unit configured to receive a video stream of 3D video data and a data stream of presentation data to be overlaid over video images generated from the video stream, a display area for the presentation data differing in size from a display area for the video images; a video image generating unit configured to generate left-view images and right-view images from the video stream; an enlarging unit configured to enlarge the presentation data by a predetermined factor so as to scale a display area for the enlarged presentation data to match the display area for the video images; a data generating unit configured to generate left-view presentation data and right-view presentation data by using the enlarged presentation data and an offset value determined to cause a parallax between the left-view presentation data and the right-view presentation data; and a display processing unit configured to overlay the left-view presentation data over the left-view images and the right-view presentation data over the right-view images to display video images resulting from the overlaying.

2. First Embodiment

The following describes a first embodiment in details, with reference to the drawings.

To begin with, a description is given of the stream construction for a digital broadcasting, which is the technology on which the description of the present embodiment is based. In addition, a description is given of a conventional 2D television receiver (video processing device).

2.1 Stream Construction

According to one standard for digital broadcasting, a digital stream in the MPEG-2 transport stream format is used for transmitting a broadcast wave (hereinafter, such a stream is simply referred to as a "transport stream").

As shown in FIG. 1, a transport stream is generated by multiplexing two or more streams out of video, audio, caption, and TextSubtitle streams, and so on. The video stream carries video images of a broadcast program, and the audio stream carries audio data of the broadcast program. The caption stream carries data used for displaying captions to be overlaid over video images on display. The TextSubtitle stream carries data used to display news flashes superimposed over video images out of synchronism with the video images. Data carried by each video stream and caption stream has been coded using a method such as MPEG-1 or MPEG-2. Data carried by each audio stream has been coded using a method such as a linear PCM method. Data carried by the TextSubtitle stream has been coded by run-length coding. Note that one transport stream may include one or more audio streams and one or more caption streams. For example, separate audio streams may be provided, one for the language Japanese and another for the language English. Similarly, separate caption streams may be provided, one for the language Japanese and another for the language English.

Figure 2:
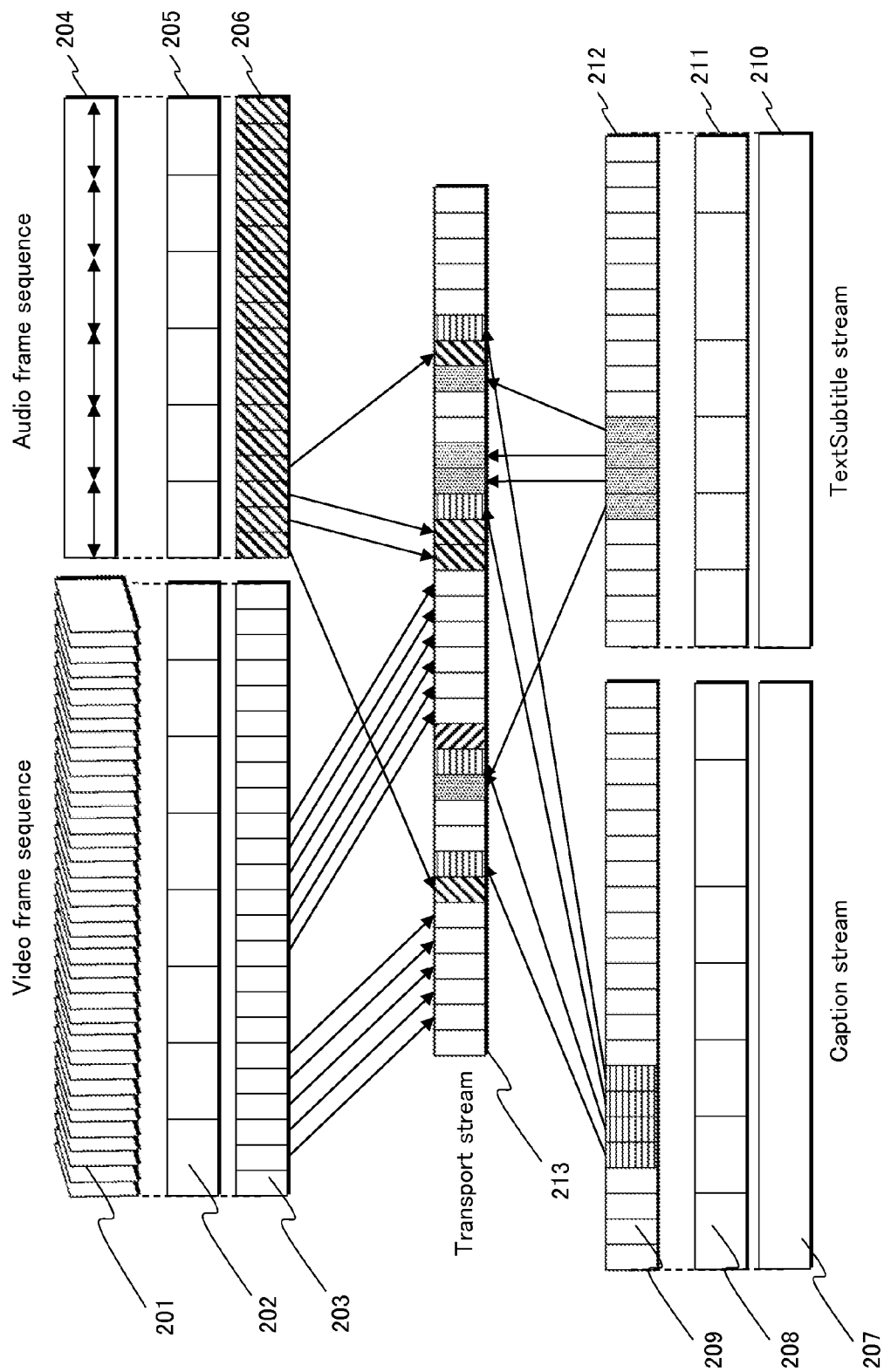
FIG. 2 schematically illustrates the construction of a transport stream.

FIG. 2 schematically illustrates the data construction of a transport stream. First, a video stream 201 is composed of a plurality of video frames and an audio stream 204 is composed of a plurality of audio frames. The video stream 201 is converted into a PES packet sequence 202 and then into a TS packet sequence 203. The audio stream 204 is converted into a PES packet sequence 203 and then into a TS packet sequence 206. Similarly, data carried by the caption stream 207 and TextSubtitle stream 210 are respectively converted into TS packet sequences 208 and 211 and then into TS packet sequences 209 and 212. The transport stream 213 is generated by multiplexing the TS packets into a single stream.

The following now describes the construction of a video stream. According to the motion picture encoding such as MPEG-2, the data volume is compressed by exploiting spatial redundancy and temporal redundancy of moving pictures. One method exploiting temporal redundancy uses inter-picture prediction encoding. With inter-picture prediction encoding, a picture (target picture) is encoded using motion vectors estimated with reference to a reference picture which is a preceding or following picture in the display order. Then, spatial redundancy is removed by using the difference between the motion-compensated picture and the target picture. As a result, the data volume is compressed. The term "picture" refers to a single unit of encoding and encompasses both a frame and a field.

In the following description, pictures that are encoded entirely by intra-picture prediction and thus without using any reference picture are called I pictures. Further, pictures encoded by inter-picture prediction with reference to one already encoded picture (past picture) are called P pictures. Pictures encoded by inter-picture prediction with reference to both past and future pictures are called B pictures. In particular, B pictures that are referenced by another picture is called Br picture. Furthermore, a frame in the frame construction and a field in the field construction are designated here as a video access unit.

Figure 3:
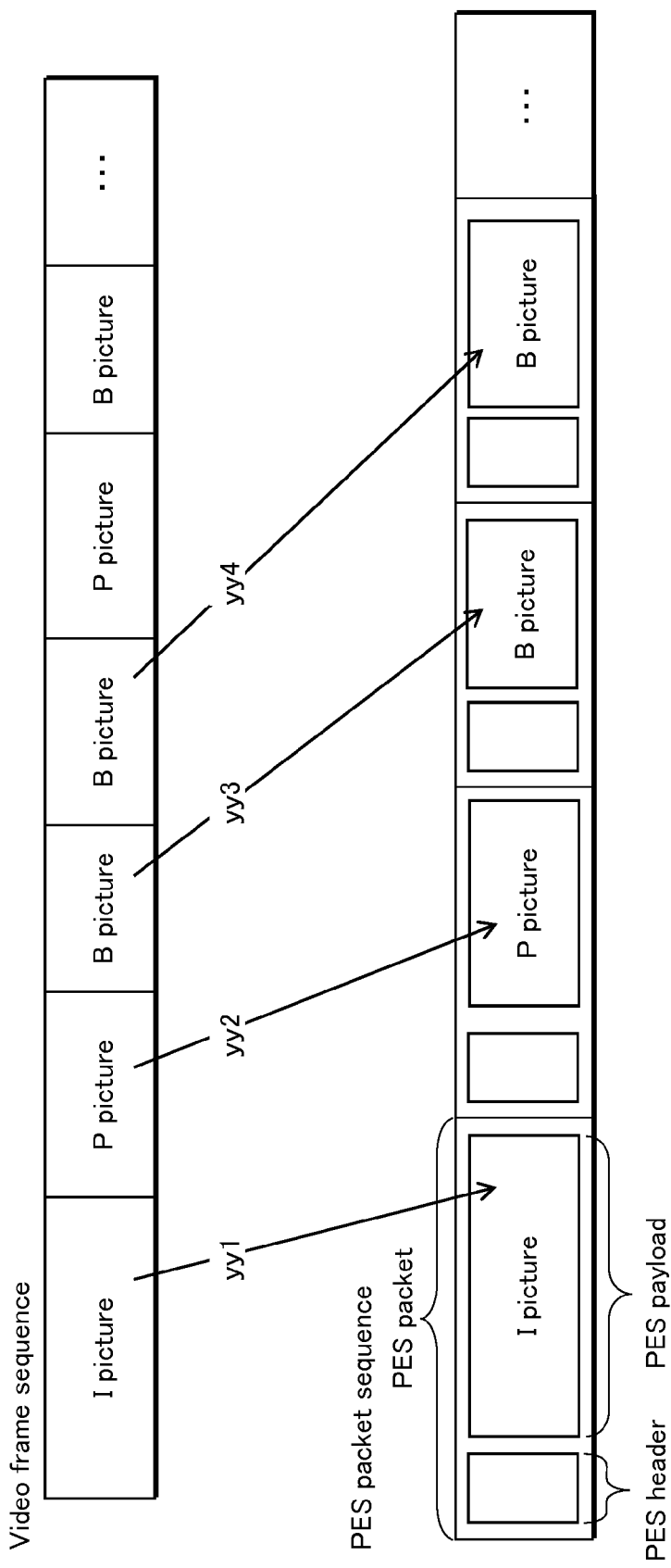
FIG. 3 illustrates conversion from a video stream to a PES packet sequence.

Next, conversion from each stream to a PES packet sequence is described. FIG. 3 illustrates conversion from a video stream to a PES packet sequence. The first tier in FIG. 3 shows the video frame sequence of the video stream, and the second tier shows the PES packet sequence. The video frame sequence is composed of a plurality of video presentation units, namely I pictures, B pictures, and P pictures. The PES packet sequence is composed of a plurality of PES packets. Each PES packet is composed of a PES header and a PES payload. As indicated by the arrows yy1, yy2, yy3, and yy4 in FIG. 3, the video stream is divided into pictures to be separately stored into the payloads of the PES packets. The PES header contains a PTS (presentation time-stamp) indicating the time at which the corresponding picture is to be displayed and a DTS (decoding time-stamp) indicating the time at which the corresponding picture is to be decoded.

Figure 4:
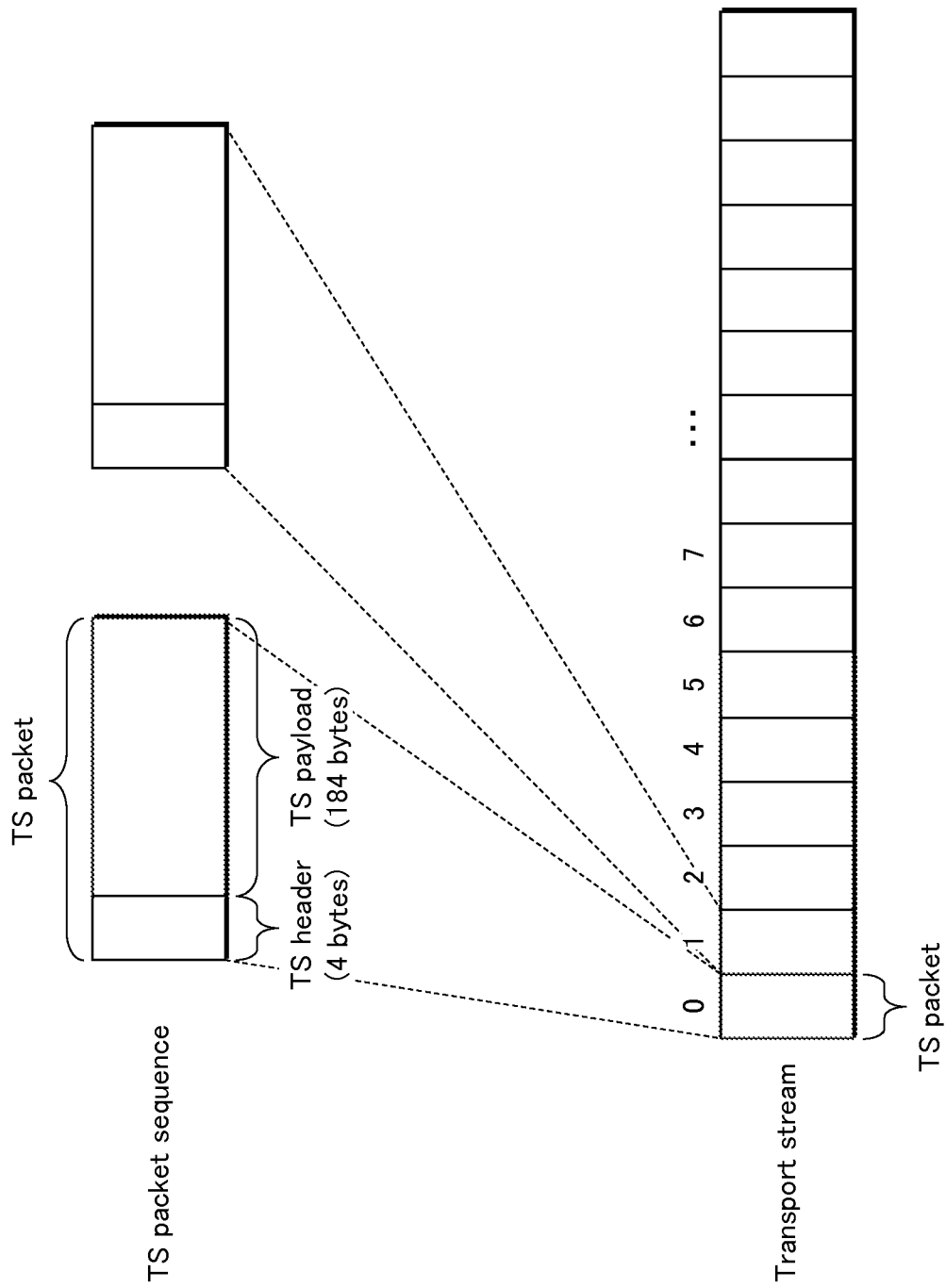
FIG. 4 illustrates TS packets contained in a transport stream.

As shown in FIG. 4, the TS packets converted from PES packets and included in the transport stream are each composed of a TS header and a TS payload. The former is 4-byte long and the latter is 184-byte long. Thus, one TS packet is 188 byte long. The transport stream is a sequence of a plurality of TS packets. The PES packets are divided into pieces of data each of which is 184 bytes long, and each piece of data is stored into a TS payload. The TS header contains information, such as a PID (packet identifier) assigned to the data stored in the TS payload. In addition, some TS packets may carry a program association table (PAT) or a program map table (PMT), instead of video, audio, caption streams. The PMT holds PIDs and pieces of attribute information of the respective streams constituting one program. The PMT also holds various descriptors relating to the program. For example, some descriptors describe copy control information indicating whether copying of the program is permitted or prohibited. The detailed data construction of the PMT is described later. The PAT holds the identifier of the program (program number) and the PIDs held in the PMT. Note that the PAT itself is assigned a PID of 0.

Figure 5:
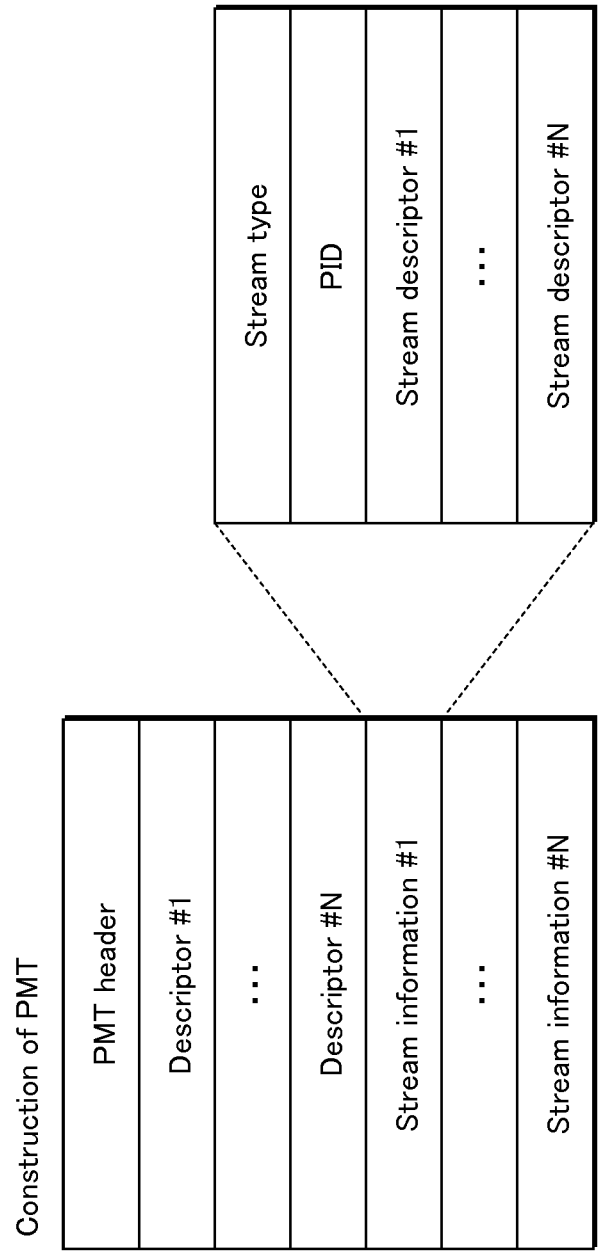
FIG. 5 illustrates the construction of a PMT.

FIG. 5 illustrates the data construction of the PMT. The PMT has a PMT header at the head of the PMT. The PMT header describes the length, etc., of data stored in the PMT. Following the header are descriptors relating to the program, the copy control information mentioned above is described in the descriptors. Following the descriptors are pieces of stream information relating to the respective streams constituting the program. The stream information is composed of the stream type which identifies the compression codec of the stream, etc, the stream PID, and the stream descriptors which describe the attribute information of the stream (frame rate, aspect ratio, etc). The number of stream descriptors equals the number of streams constituting the program.

Figure 6:
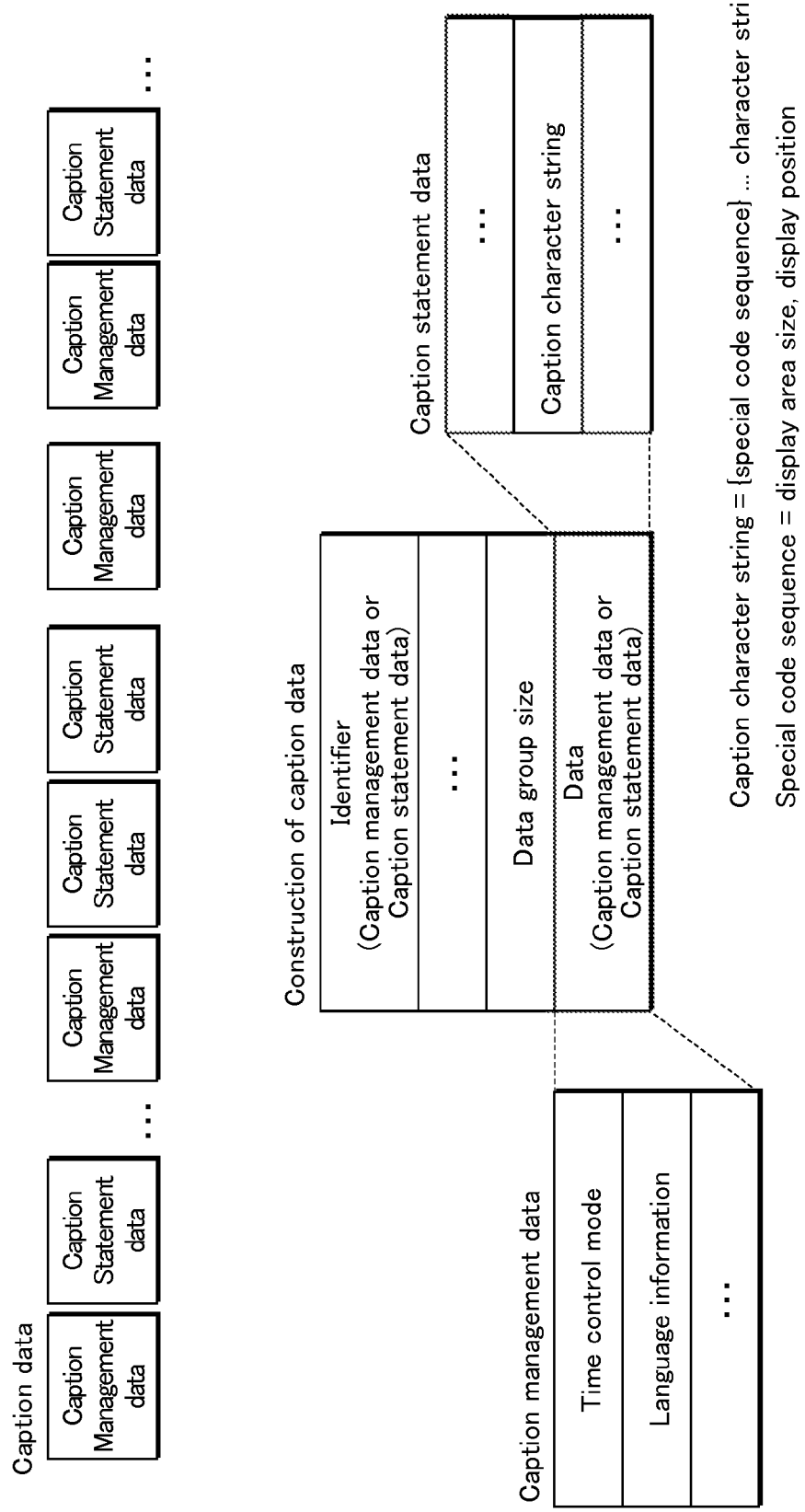
FIG. 6 illustrates the construction of caption data.

As illustrated in the upper tier of FIG. 6, the caption stream contains both caption management data and caption statement data. At the receiving end, once a piece of caption management data (first caption management data) is received, the caption statement contained in the caption statement data is displayed based on the information defined by the first caption management data until the next piece of caption management data (second caption management data) is received.

Figure 7:
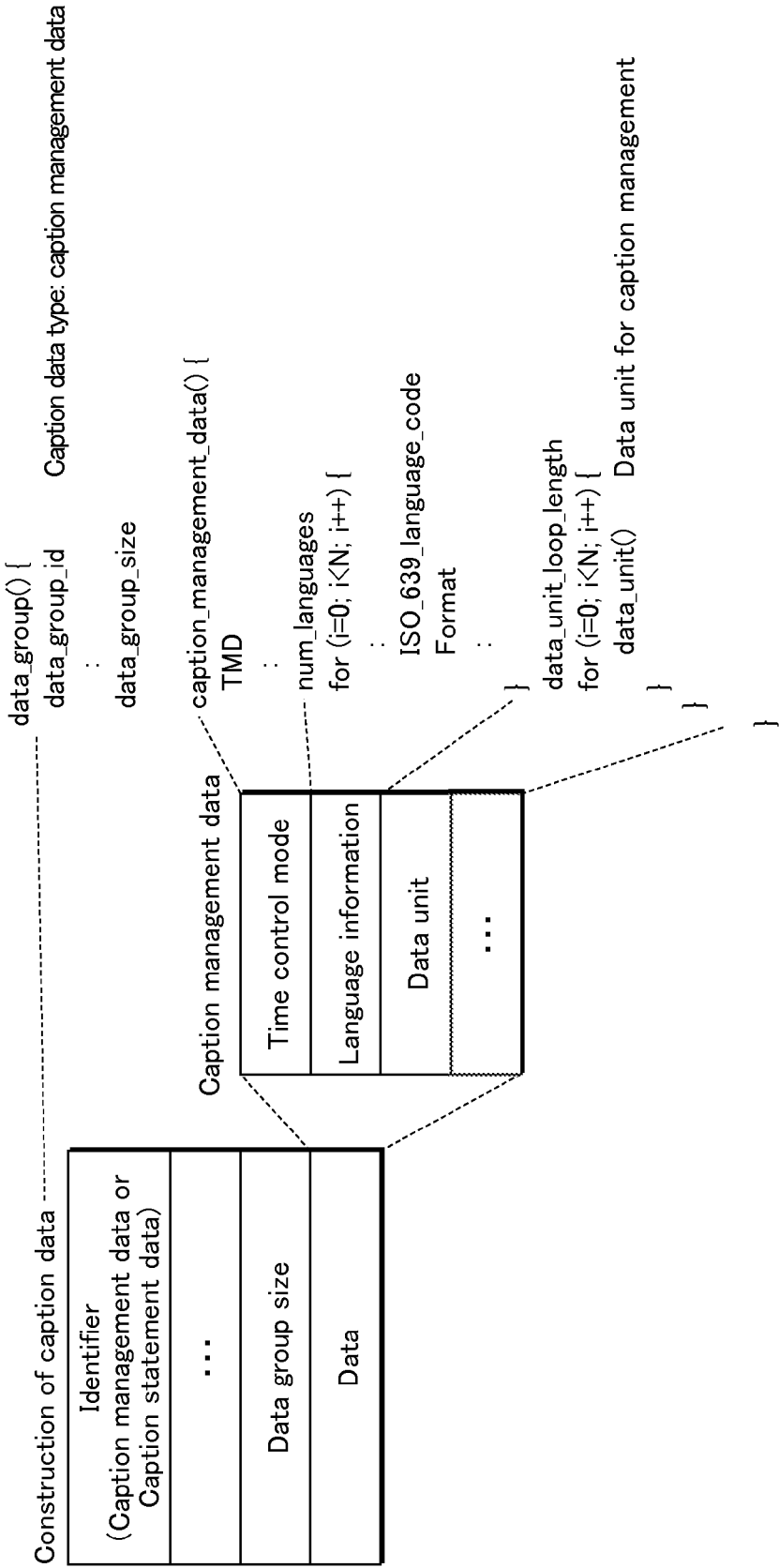
FIG. 7 illustrates the construction of caption management data.
Figure 8:
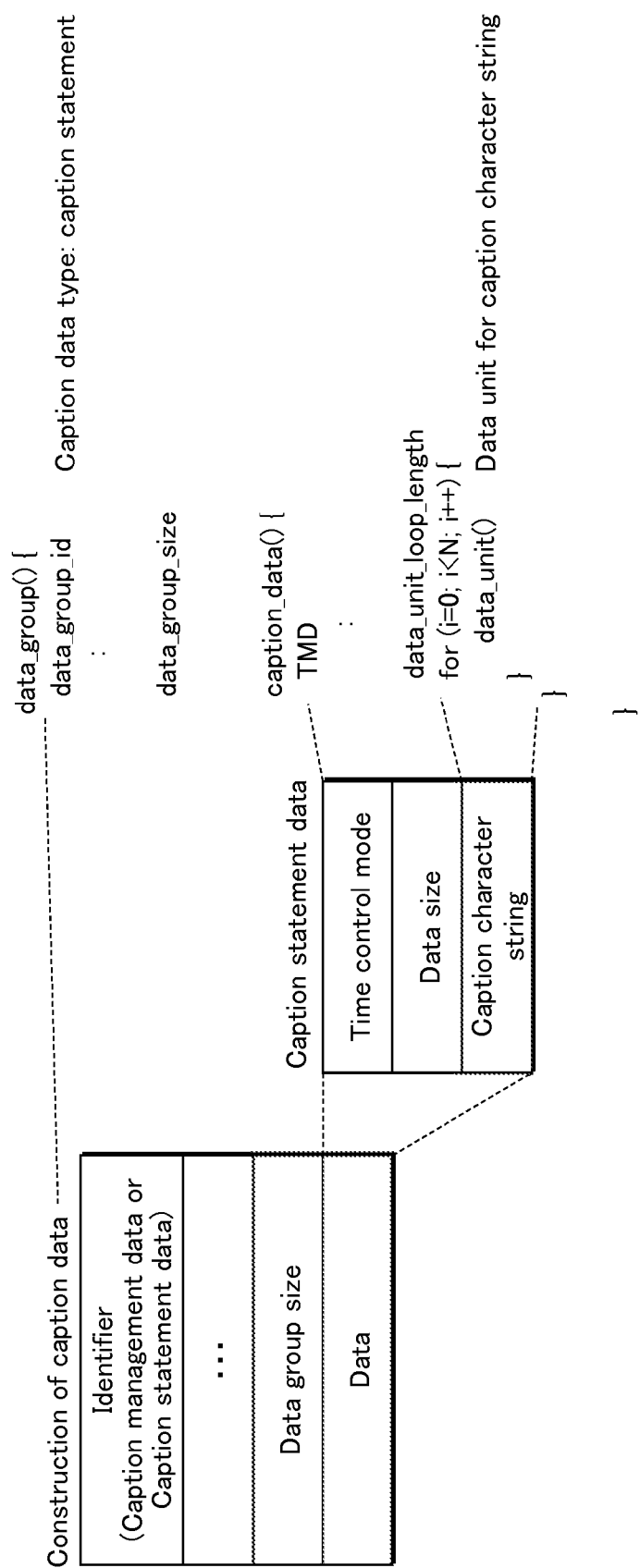
FIG. 8 illustrates the construction of caption statement data.

The caption management data and caption statement data are defined using the common data construction, which is schematically illustrated in the bottom tier of FIG. 6 (hereinafter, referred to as the "caption data construction"). FIGS. 7 and 8 illustrate the detailed data constructions of the caption management data and caption statement data, respectively. As shown in the bottom tier of FIG. 6, the caption data construction is composed of an identifier, . . . data group size, and data.

The identifier shows whether the caption data construction defines caption management data or caption statement data. As shown in FIGS. 7 and 8, this field is specified as "data_group_id".

The data group size indicates the number of bytes of data placed following the data group size (i.e., the number of bytes of caption management data or caption statement). As shown in FIGS. 7 and 8, this field is specified as "data_group_size".

When the identifier identifies the caption management data, the data placed following the data group size includes the caption management data, and when the identifier identifies the caption statement data, the data placed following the data group size includes caption statement.

The construction of the caption management data defined by the data placed following the data group size is described with reference to FIG. 7. As shown in FIG. 7, the caption management data includes a time control mode, language information, and data units.

The time control mode indicates the mode of controlling the time at the time of reception and playback of data. As shown in FIG. 7, the time control mode is specified as "TMD". In particular, the TMD is set to one of "free", "real time", and "offset time".

The language information includes the number of caption languages and information indicating that the display language is Japanese, English, or the like. As shown in FIG. 7, these fields are specified as "num_languages", "ISO_639_language_code", and "Format". Firstly, "num_languages" shows the number of languages. Then, "ISO_639_language_code" shows the language code corresponding to the language, and the "format" indicates the initial state of the display format of the caption display screen. Note that the number of sets of "ISO_639_language_code" and "format" provided equals to the number shown by "num_languages".

As the data unit, a variable number of data entities called "data_unit" are provided as shown in FIG. 7. Each "data_unit" stores data that is valid throughout the entire caption program carried by the same ES as the data_unit.

Next, the construction of the caption statement data is described with reference to FIG. 8. As shown in FIG. 8, the caption statement data includes a time control mode, a data size, and a caption character string. As shown in FIG. 6, the caption character string can include a special code sequence that determines the display area size and display position, etc of the captions. The display area size is, for example, the number of letters to be displayed, and the display position indicates the starting point of a rectangle representing the display area size.

The time control mode is the same as the time control mode of the caption management data shown in FIG. 7.

The data size shows the whole byte length of the caption character string that follows and specified as "data_unit_loop_length" shown in FIG. 8.

The caption character string is defined by a variable number of data entities called "data_unit" as shown in FIG. 8. Each "data_unit" stores data constituting the caption statement.

2.2 2D Video Images and Video Processing Device 10

The following describes the configuration of the video processing device 10 that overlays captions over 2D video images.

Figure 9:
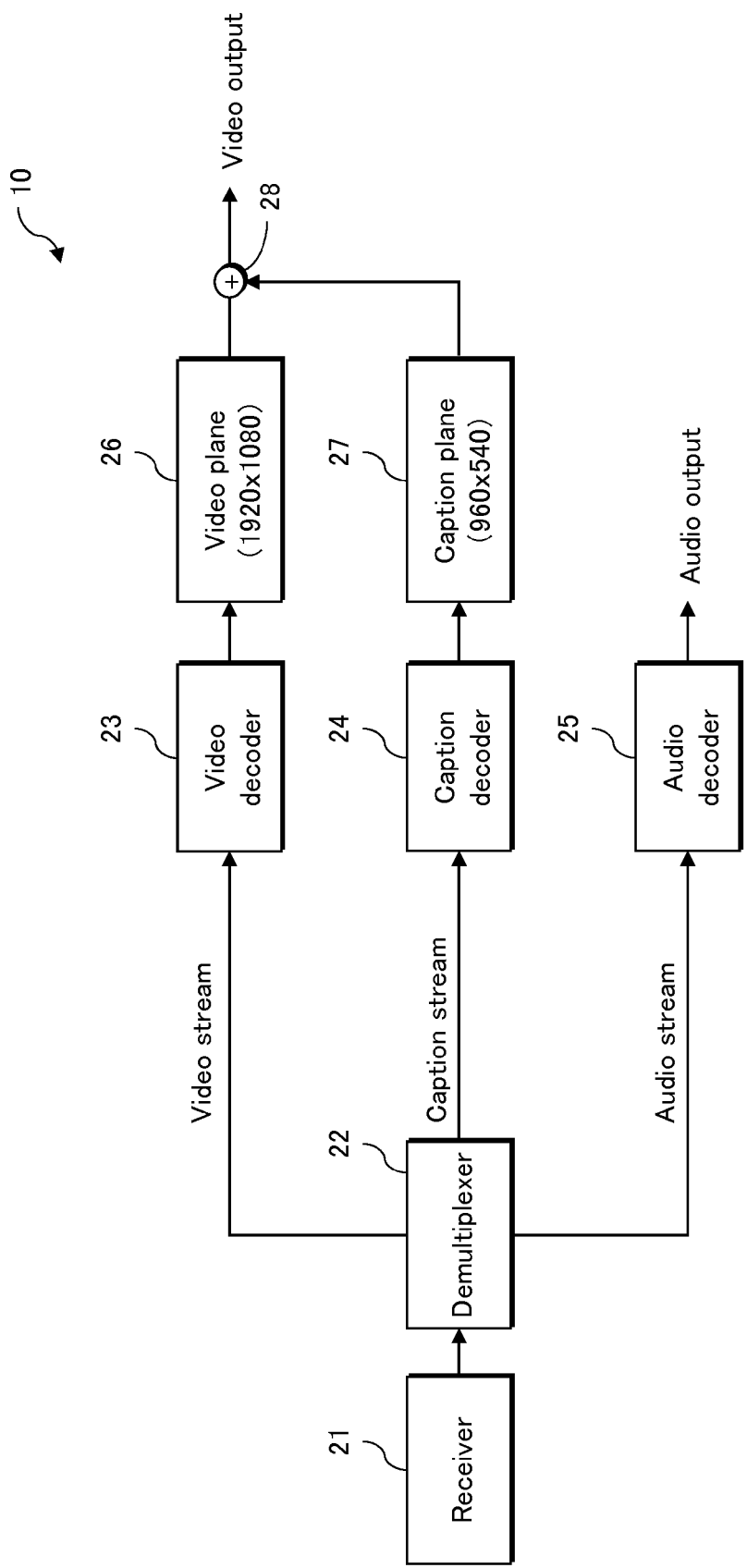
FIG. 9 is a block diagram of the construction of a video processing device 10 for overlying captions over 2D video images.

As shown in FIG. 9, the video processing device 10 includes a receiver 21, a demultiplexer 22, a video decoder 23, a caption decoder 24, an audio decoder 25, a video plane 26, and a caption plane 27, and a compositing unit 28.

The receiver 21 receives a transport stream from a broadcasting station and outputs the received transport stream to the demultiplexer 22. According to the present embodiment, the transport stream includes video, audio, and caption streams multiplexed therein.

The demultiplexer 22 separates the received transport stream into the video, caption, and audio streams and outputs the video stream to the video decoder 23, the caption stream to the caption decoder 24, and the audio stream to the audio decoder 25.

The video decoder 23 decodes the video stream into video frames (2D video images) and outputs the video frames to the video plane 26. More specifically, the video decoder 23 decodes the individual video access units included in the video stream at the predetermined decoding times (DTSs) stored in the respective PES headers. As a result, the flame/field images are generated. The video decoder 23 switches the decoding method depending on the compression coding of the video stream. The video decoder 23 stores the flame/field images generated by the decoding to the video plane 26 at the times indicated by the presentation times (PTSs) stored in the respective PES headers.

The caption decoder 24 decodes the caption stream into caption statements and outputs the resulting caption statements to the caption plane 27. More specifically, the caption decoder 24 decodes the encoded caption data contained in the caption stream at the predetermined decoding times (DTSs) stored in the respective PES headers. As a result, caption statements are generated. The caption decoder 24 stores the caption statements to the caption plane 27 at the presentation times (PTSs) stored in the respective PES headers. Here, the caption decoder 24 renders the caption statement to be displayed, at the display position in the display area of the caption plane 27 according to the information (special code sequence) contained in the caption character string.

The audio decoder 25 decodes the audio stream into sounds and reproduces the sounds.

The video plane 26 is a plane memory for storing a video frame acquired by the video decoder 23 and offers 1920× 1080 resolution. The caption plane 27 is a plane memory for storing the caption statement acquired by the caption decoder 24 and offers a resolution of 960×540.

When a video frame stored on the video plane 26 is to be output, the compositing unit 28 overlays the caption statement which is stored on the caption plane 27 over the video frame. Since the size of the caption statement differs from the size of the video frame, the compositing unit 28 enlarges the caption statement by doubling the data pixels of the caption plane 27 in both the horizontal and vertical directions to achieve the same resolution as the video plane 26. The compositing unit 28 then overlays the caption statement which has been enlarged to two times the original size in the horizontal and vertical directions, over the video frame on the video plane 26 to produce final video output.

Described above is the configuration of the video processing device 10 for overlaying captions over 2D video images. This configuration allows the video processing device 10 having the video plane 26 and the caption plane 27 of different resolutions to overlay captions over video images after adjusting the respective resolutions to be equal to each other.

2.3 Principle of 3D Playback

Figure 10A:
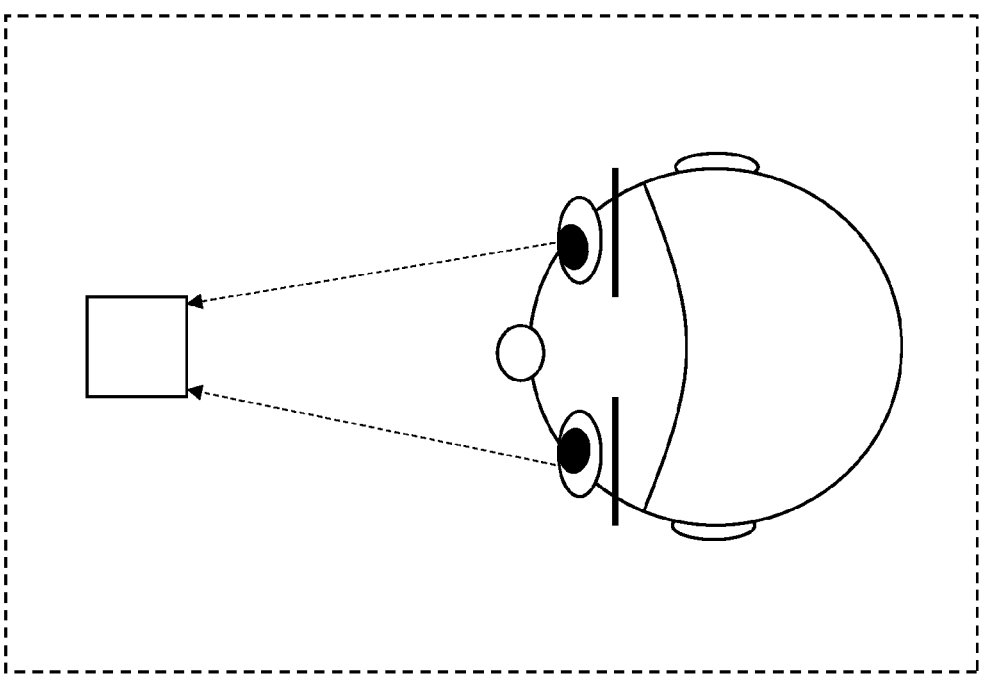
FIGS. 10A, 10B, and 10C are for illustrating the principle for implementing stereoscopic viewing with the use of a display device.
Figure 10B:
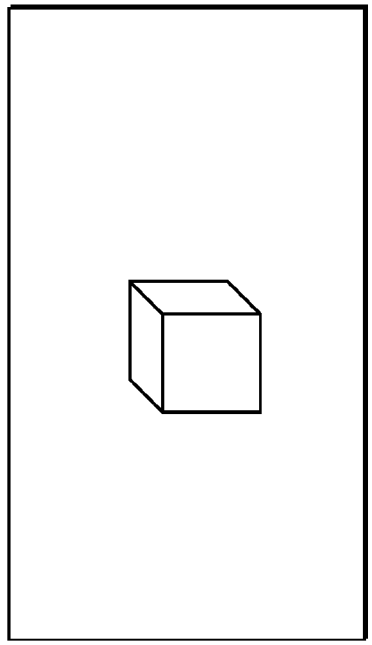

The following now describes the principles for implementing stereoscopic viewing with household displays, with reference to FIGS. 10A, 10B. and 10C.

Stereoscopic viewing can be implemented by the following two major technologies, one of which is a method using holography techniques and the other using parallax images. The following description is directed to the method using parallax images.

Figure 10C:
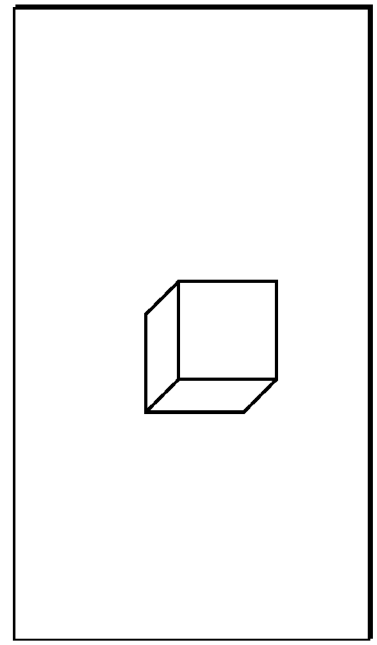

The method using parallax images realizes stereoscopic viewing by separately preparing images to be perceived by the left eye and images to be perceived by the right eye and then presenting the images in a manner to ensure that each image is perceived only by the corresponding eye. FIG. 10A is illustrates, as seen from above, a user viewing a relatively small cubic object located on an imaginary straight line extended from middle of the face of the user. FIG. 10B illustrates an example of the cubic object as perceived by the left eye, whereas FIG. 10C illustrates an example of the same object as perceived by the right eye.

To implement stereoscopic display with a household display, the display alternately presents video images for the respective eyes. Then, the use of shutter glasses or polarized glasses ensures that the images for the left eye and images for the right eye are presented on the display so as to be perceived only by each corresponding eye. While there have been various techniques proposed for realizing stereoscopic viewing using parallax images, the present embodiment is directed to, but not limited to, the method employing shutter glasses. Any other method may be used as long as parallax images are used.

Here, each video image to be presented for the left eye is referred to as the "left-view image", and each video image for the right eye is referred to as the "right-view image". Each pair of left- and right-view images is collectively referred to as a "3D video image".

This concludes the description of the technology on which the description of the present embodiment is based.

2.4 Overview of Present Embodiment

The following describes an overview of the present embodiment.

A video processing system 1100 according to the present embodiment is composed of a 3D digital television receiver (video processing device) 1200 and a transmitter device 1300, as shown in FIG. 11.

The transmitter device 1300 transmits a transport stream into which video, audio, and caption streams are multiplexed, from among various streams, such as video, audio, caption, and TextSubtitle streams shown in FIG. 1. The video stream is in TS format that is for carrying encoded video images seen from a plurality of viewpoints (3D video images, for example). The display size (resolution) of a 3D video image is 1920×1080, and the display size (resolution) for a caption stream is 960×540.

The video processing device 1200 receives a transport stream from the transmitter device 1300 and generates 3D video images (left- and right-view images) from the video stream wrapped in the transport stream and left- and right-view caption statements from the caption stream. To display final video output, the left- and right-view caption statements are overlaid over the left- and right-view images, respectively.

2.5 Configuration of Video Processing Device 1200

The following describes the configuration of the video processing device 1200.

Figure 12:
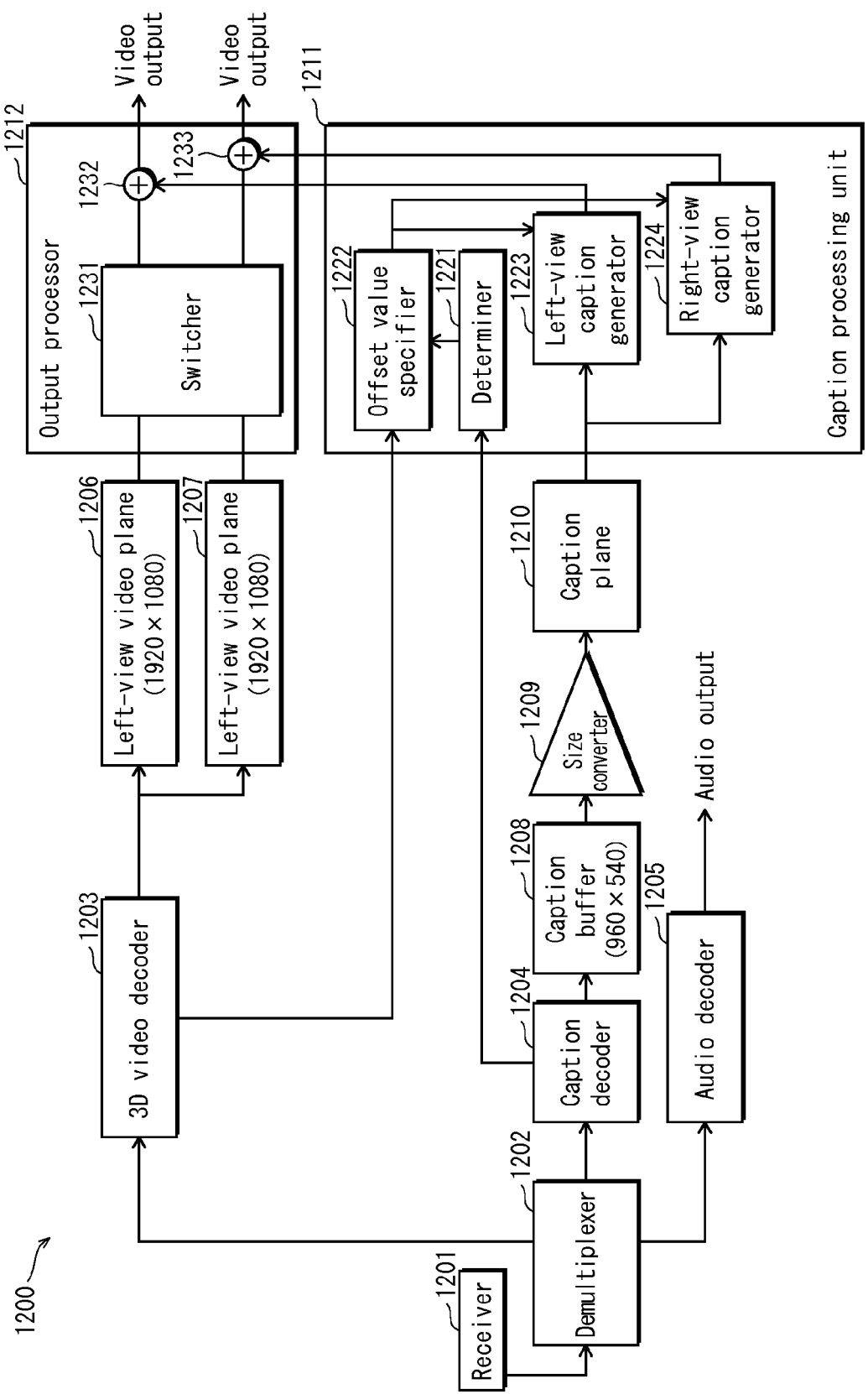
FIG. 12 is a block diagram of the construction of a video processing device 1200.

As shown in FIG. 12, the video processing device 1200 includes a receiver 1201, a demultiplexer 1202, a 3D video decoder 1203, a caption decoder 1204, an audio decoder 1205, a left-view image plane 1206, a right-view image plane 1207, a caption buffer 1208, a size converter 1209, a caption plane 1210, a caption processing unit 1211, an output processor 1212.

(1) Receiver 1201

The receiver 1201 receives a transport stream from the transmitter device 1300 and outputs the received transport stream to the demultiplexer 1202.

(2) Demultiplexer 1202

The demultiplexer 1202 is, for example, a demultiplexer circuit and separates the transport stream received from the receiver 1201 into video, audio, caption streams and outputs the video stream to the 3D video decoder 1203, the caption stream to the caption decoder 1204, and the audio stream to the audio decoder 1205.

(3) 3D Video Decoder 1203

The 3D video decoder 1203 decodes the video stream received from the demultiplexer 1202 into left- and right-view images. Then, the 3D video decoder 1203 writes the left-view images on the left-view image plane 1206 and the right-view image on the right-view image plane 1207.

More specifically, the 3D video decoder 1203 decodes the video stream containing video images seen from a plurality of viewpoints into left- and right-view images.

Figure 13:
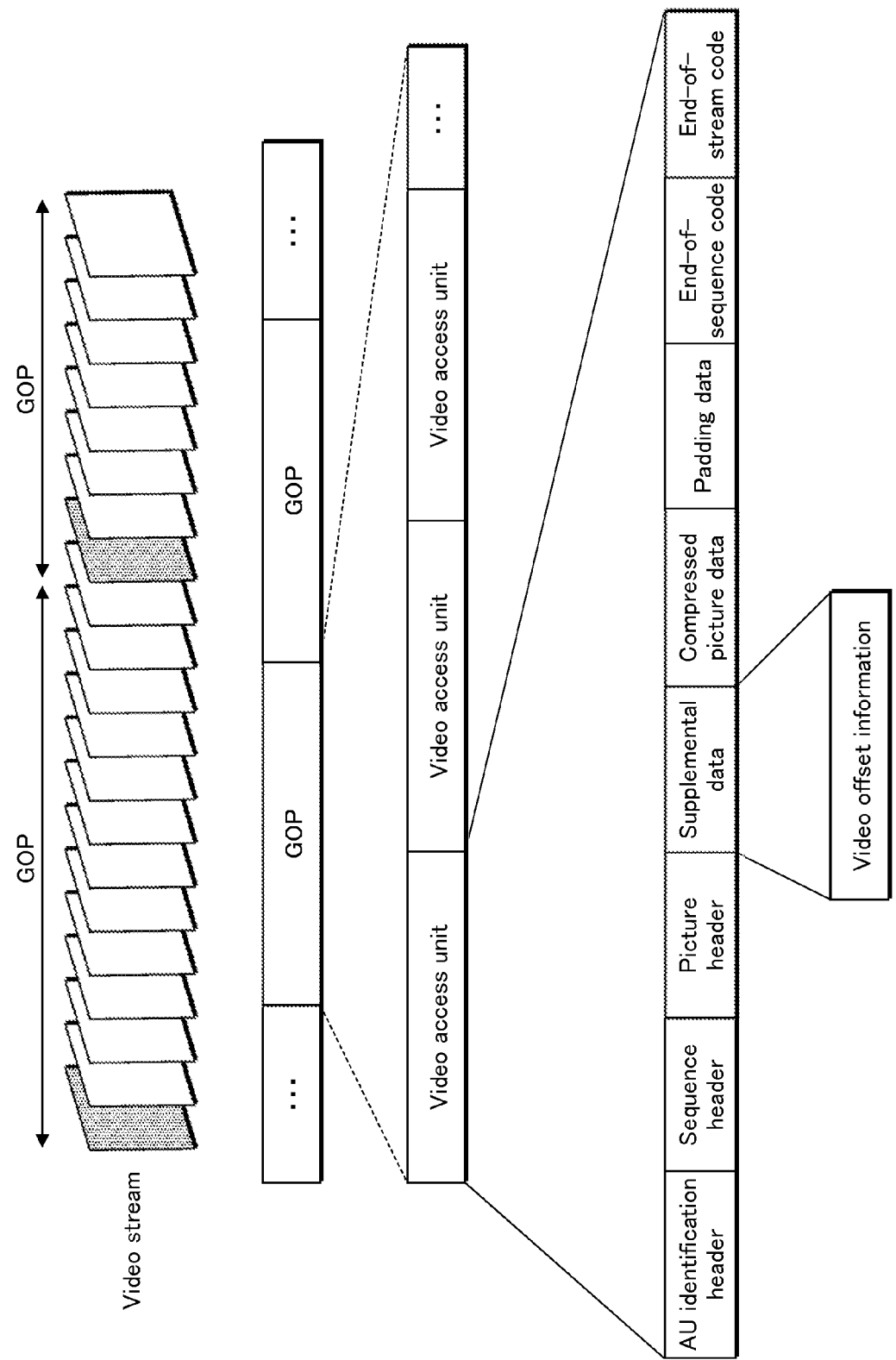
FIG. 13 illustrates the storage position of video offset information.

In addition, the video access units acquired from the video stream contains video offset information as supplementary data, as shown in FIG. 13. The video offset information has the data construction shown in FIG. 14 and is composed of a plurality of pairs of an offset value (offset_value) and an offset sequence ID (offset_sequence_id) identifying the offset value.

The 3D video decoder 1203 outputs video offset information acquired through the decoding of the video stream to the caption processing unit 1211.

(4) Caption Decoder 1204

The caption decoder 1204 decodes the caption stream received from the demultiplexer 1202 into caption statement data and writes the caption statement represented by the caption statement data to the caption buffer 1208. More specifically, the caption decoder 1204 refers to the time control mode and data size that are included in the caption statement data and writes the caption statement of the length indicated by the data size from the caption character string to the caption buffer.

Figure 15:
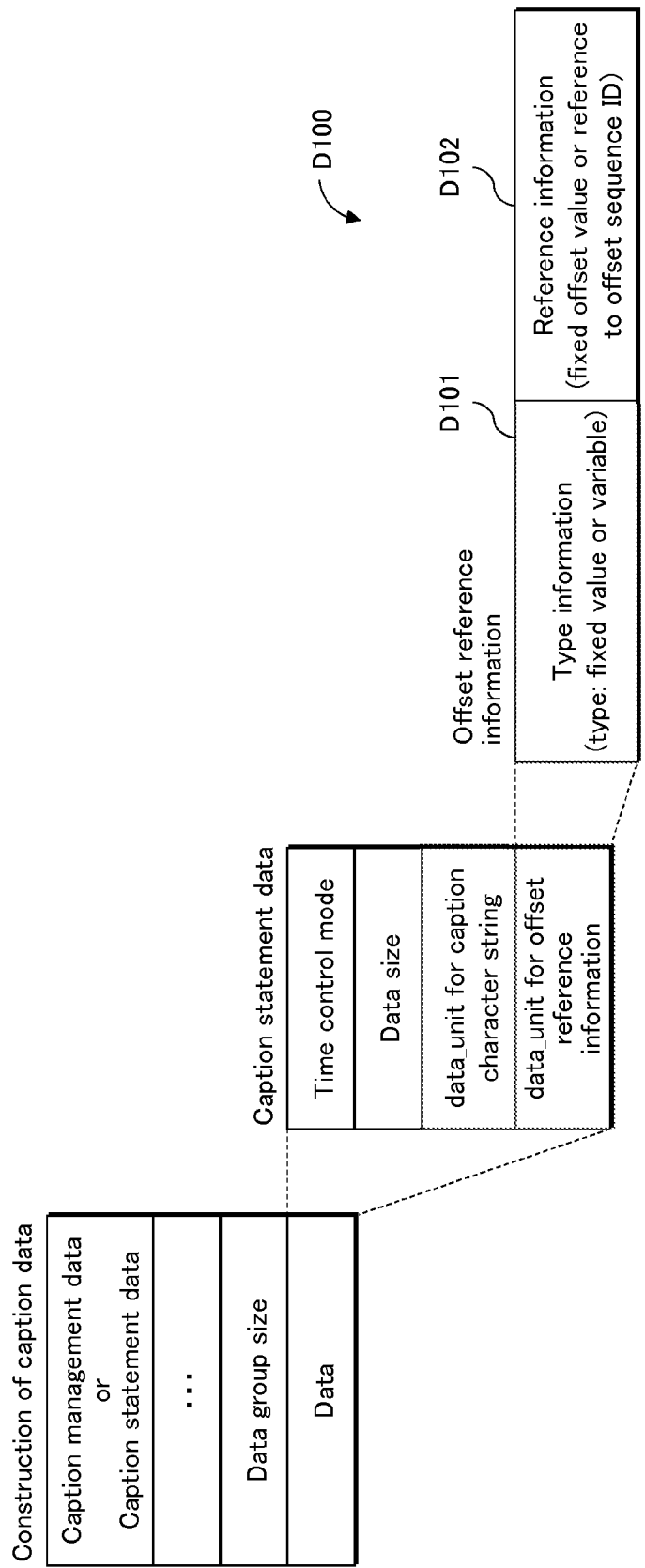
FIG. 15 illustrates the construction of caption statement data that includes offset reference information.

The caption statement data generated from the caption stream has the data construction shown in FIG. 8 and additionally includes offset reference information D100 in the data unit that follows the caption statement as shown in FIG. 15. The offset reference information D100 includes information (type information) D101 and reference information D102. The type information D101 shows whether the offset value is a fixed value or reference value, and the contents of the reference information D102 match the type information D101. In particular, with when the type information D101 shows that a fixed value is used, the reference information stores the value. On the other hand, when the type information D101 shows that a reference value is used, the reference information stores an offset sequence ID as a pointer to a referenced value.

After writing the caption statement included in the caption character string, the caption decoder 1204 reads the offset reference information that follows the caption character string and outputs the read offset reference information to the caption processing unit 1211.

(Offset Reference Information)

The following describes the data construction of the offset reference information, with reference to FIGS. 16A and 16B.

As stated above, the offset reference information is defined as a data unit of the caption statement data. Therefore, the data unit parameter assigned to the data unit is "0x38" as shown in FIG. 16A to indicate that the data unit defines offset reference information. This allows the device to identify that the data unit having the data unit parameter "0x38" defines offset reference information.

FIG. 16B shows the data construction of offset reference information. The descriptor "offset_type" defines the type information D101 stated above. In this embodiment, the value "00" indicates that a fixed value is used, and "01" indicates that a reference value is used. Then, the IF statement that follows the "offset_type" descriptor describes information that matches the value held by the type information D101. For example, when the descriptor "offset_type" holds the value "00", the descriptor "fixed_offset_value" describes a fixed value. On the other hand, when the descriptor offset_type holds the value "01", the descriptor "offset_sequence_id_ref" describes an offset sequence ID.

(5) Audio Decoder 1205

The audio decoder 1205 decodes the audio stream received from the demultiplexer 1202 to generate audio data. The audio decoder 1205 reproduces sounds according to the audio data.

(6) Left-View Image Plane 1206

The left-view image plane 1206 is memory capable of storing pixel data which corresponds to one screen line by line and used to store a left-view image generated by the 3D video decoder 1203. The pixel data stored in the left-view image plane 1206 is output according to horizontal and vertical synchronization signals. In this embodiment, the size of the left-view image plane 1206, i.e., the size of one image is 1920×1080.

(7) Right-View Image Plane 1207

The right-view image plane 1207 is memory capable of storing pixel data which corresponds to one screen line by line and used to store a right-view image generated by the 3D video decoder 1203. The pixel data stored in the right-view image plane 1207 is output according to horizontal and vertical synchronization signals. In this embodiment, the size of the right-view image plane 1207 is equal to the size of the left-view image plane 1206.

(8) Caption Buffer 1208

The caption buffer 1208 is a buffer for storing the caption statement, which corresponds to one screen, generated by the caption decoder 1204. The size of the caption buffer 1208 is 960×540. In short, the buffer size refers not to the size of a limited portion of the screen in which a caption is actually displayed but to the size of the maximum area (entire screen) including that portion.

(9) Size Converter 1209

The size converter 1209 scales the caption statement, which corresponds to one screen, stored in the caption buffer 1208 from its original size (960×540) to the size of left- and right-view images (1920×1080) by enlarging it by a predetermined factor (twice both vertically and horizontally). In particular, this is carried out by allocating one pixel to the area that is twice as large both vertically and horizontally. In short, the same pixel is copied to four pixels.

(10) Caption Plane 1210

The caption plane 1210 is memory capable of storing pixel data which corresponds to one screen line by line and used to store the pixel data representing an image of the caption statement scaled to the size 1920×1080 by the size converter 1209. The pixel data stored in the caption plane 1210 is output according to horizontal and vertical synchronization signals.

(11) Caption Creating and Processing Unit 1211

The caption processing unit 1211 generates a caption statement image for the left eye (hereinafter, a left-view caption image) and a caption statement image for the right eye (hereinafter, a right-view caption image) by applying an appropriate offset value to the caption statement image stored on the caption plane 1210. The offset value applied herein is the one conforming to the instruction given from the transmission source of video images.

As shown in FIG. 12, the caption processing unit 1211 includes a determiner 1221, an offset value specifier 1222, a left-view caption generator 1223, and a right-view caption generator 1224.

(11-1) Determiner 1221

The determiner 1221 determines whether the offset value to be used to generate left- and right-view caption images is a fixed value or a reference value.

More specifically, the determiner 1221 receives the offset reference information D100 from the caption decoder 1204. The determiner 1221 determines whether the value held in the type information D101 of the offset reference information D100 is "00" or "01". The determiner 1221 determines to use a fixed value when the value is "00" and to use a reference value when the value is "01". The determiner 1221 outputs the determination result with the reference information D102 included in the received reference information D100 to the offset value specifier 1222.

(11-2) Offset Value Specifier 1222

The offset value specifier 1222 specifies the offset value used to generate the left- and right-view caption images based on the determination result of the determiner 1221.

More specifically, the offset value specifier 1222 acquires the fixed value included in the reference information received from the determiner 1221 when the determination result received from the determiner 1221 indicates that a fixed value is to be used. The thus acquired fixed value is output to the left-view caption generator 1223 and the right-view caption generator 1224. On the other hand, when the received determination result indicates that a reference value is to be used, the offset value specifier 1222 first acquires the offset sequence ID included as the reference value in the reference information received from the determiner 1221 and then acquires the value corresponding to the offset sequence ID from the video offset information received from the 3D video decoder 1203. The thus acquired value is output to the left-view caption generator 1223 and the right-view caption generator 1224.

(11-3) Left-View Caption Generator 1223 and Right-View Caption Generator 1224

The left-view caption generator 1223 generates a left-view caption statement image from the caption statement image stored on the caption plane 1210, and the right-view caption generator 1224 generates a right-view caption statement image from the caption statement image stored on the caption plane 1210.

More specifically, the left-view caption generator 1223 adds the offset value received from the offset value specifier 1222 to the horizontal coordinates of the respective pixels stored on the caption plane 1210 to generate a left-view caption statement image. The thus generated caption statement image is output to the output processor 1212. Similarly, the right-view caption generator 1224 subtracts the offset value received from the offset value specifier 1222 from the horizontal coordinates of the respective pixels stored on the caption plane 1210 to generate a right-view caption statement image. The thus generated caption statement image is output to the output processor 1212.

For example, suppose that a positive value is set as the offset value. In this case, as shown in FIG. 17A, the left-view caption statement generated by adding the offset value to the horizontal coordinates of the respective pixels of the caption statement image stored on the caption plane 1210 is shifted to the right (positive direction). On the other hand, the right-view caption statement generated by subtracting the offset value to the horizontal coordinates of the respective pixels of the caption statement image stored on the caption plane 1210 is shifted to the left (negative direction). The thus generated caption images are displayed as a pair of parallax images. By alternately displaying images of the left- and right-view caption statements one by one, the monoscopic caption graphics (caption statement) appears closer toward the viewer than the video images as shown in FIG. 17B. In this way, 3D display can be implemented without having to prepare two separate sets of image data (caption statement data), namely one for left eye and the other for right eye, by providing the offset value used to shift the front-view graphics data (monoscopic caption statement data) to the right and left.

(12) Output Processor 1212

The output processor 1212 overlays the left- and right-view caption statements over the left- and right-view images, respectively, and outputs the images resulting from the overlaying to produce stereoscopic viewing of video images.

As shown in FIG. 12, the output processor 1212 includes a switcher 1231 and compositing units 1232 and 1233.

(12-1) Switcher 1231

The switcher 1231 switches between the left- and right-view images at predetermined time intervals to implement 3D display. Suppose, for example, that a 2D video image is output at every ⅙₀ second. In this case, to implement 3D display, left- and right-view images need to be alternately output so as to result in display of a 3D video image at every ⅙₀. That is, the left- and right-view images need to be alternately output at every ¹⁄₁₂₀.

More specifically, the switcher 1231 makes switching between the connection from the left-view image plane 1206 to the compositing unit 1232 and the connection from the right-view image plane 1207 to the compositing unit 1233 at predetermined intervals (at every ¹⁄₁₂₀ second, for example). For example, at a specific point in time, the switcher 1231 connects the left-view image plane 1206 to the compositing unit 1232 and disconnects the right-view image plane 1207 from the compositing unit 1233 for the time being. After the passage of ¹⁄₁₂₀ second, the switcher 1231 disconnects the left-view image plane 1206 from the compositing unit 1232 and connects the right-view image plane 1207 to the compositing unit 1233. Consequently, the output processor 1212 alternately outputs left- and right-view images at a predetermined interval to realize 3D display.

(12-2) Compositing Units 1232 and 1233

The compositing unit 1232 overlays a left-view image and a left-view caption statement image that is generated by the left-view caption generator 1223 to output a composited image.

The compositing unit 1233 overlays a right-view image and a right-view caption statement image that is generated by the right-view caption generator 1224 to output a composited image.

When, for example, the offset value is a positive integer, the left-view caption generator 1223 horizontally shifts the caption plane 1210 to the right by the amount indicated by the offset value to generate the left-view caption statement image as shown in FIG. 18. Therefore, part of the caption statement image may be forced out of the left-view image plane 1206 and such part is cropped off to overlay the remaining portion over the left-view image. Similarly, the right-view caption generator 1224 horizontally shifts the caption plane 1210 to the left by the amount indicated by the offset value to generate the right-view caption statement image as shown in FIG. 18. Therefore, part of the caption statement image may be forced out of the right-view image plane 1207 and such part is cropped off to overlay the remaining portion over the right-view image.

2.6 Configuration of Transmitter Device 1300

Figure 19:
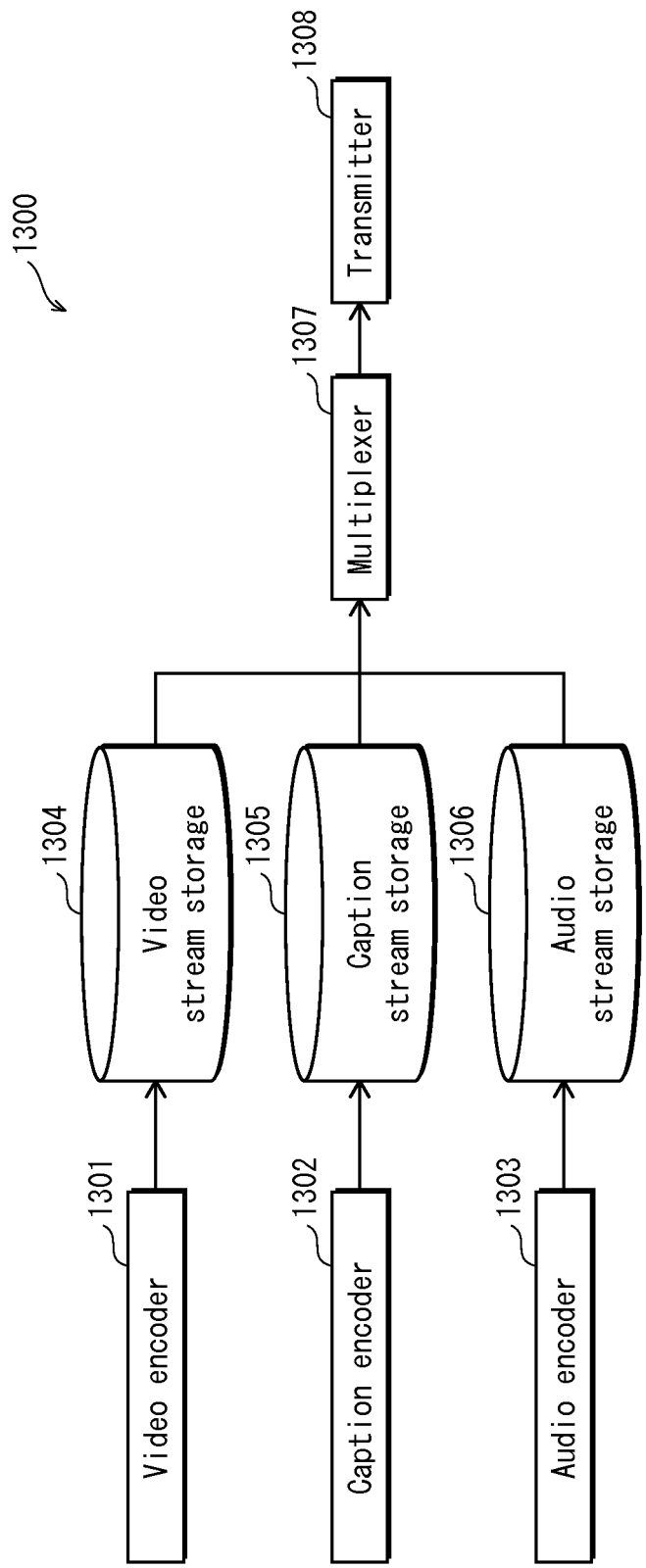
FIG. 19 illustrates the construction of a transmitter device 1300.

As shown in FIG. 19, the transmitter device 1300 includes a video encoder 1301, a caption encoder 1302, an audio encoder 1303, a video stream storage 1304, a caption stream storage 1305, an audio stream storage 1306, a multiplexer 1307, and a transmitter 1308.

(1) Video Encoder 1301

The video encoder 1301 encodes video access units (pictures) for multiple perspectives using a codec such MPEG-2 or MPEG-4, to generate a video stream and stores it into the video stream storage 1304.

(2) Caption Encoder 1302

The caption encoder 1302 encodes one or more pieces of caption management data and one or more pieces of caption statement data using a codec, such as MPEG-1 or MPEG-2, to generate a caption stream and stores it into the caption stream storage 1305.

The caption statement data subjected to encoding by the caption encoder 1302 has the data construction shown in FIG. 15. That is, the offset reference information is included subsequently to the caption statement data.

(3) Audio Encoder 1303

The audio encoder 1303 generates an audio stream by encoding audio data by linear PCM or the like to compress the data amount and write the audio stream into the audio stream storage 1306.

(4) Video Stream Storage 1304

The video stream storage 1304 is a storage area for video streams generated by the video encoder 1301.

(5) Caption Stream Storage 1305

The caption stream storage 1305 is a storage area for caption streams generated by the caption encoder 1302.

(6) Audio Stream Storage 1306

The audio stream storage 1306 is a storage area for audio streams generated by the audio encoder 1303.

(7) Demultiplexer 1307

The multiplexer 1307 generates an MPEG2 transport stream by multiplexing SI and the video, caption, audio streams stored in the video stream storage 1304, caption stream storage 1305, audio stream storage 1306, respectively, and transmits the transport stream via the transmitter 1308.

(8) Transmitter 1308

The transmitter 1308 transmits the MPEG2 transport stream generated by the multiplexer 1307.

2.7 Operation (1) Overall Operation of Processing Device 1200

Figure 20:
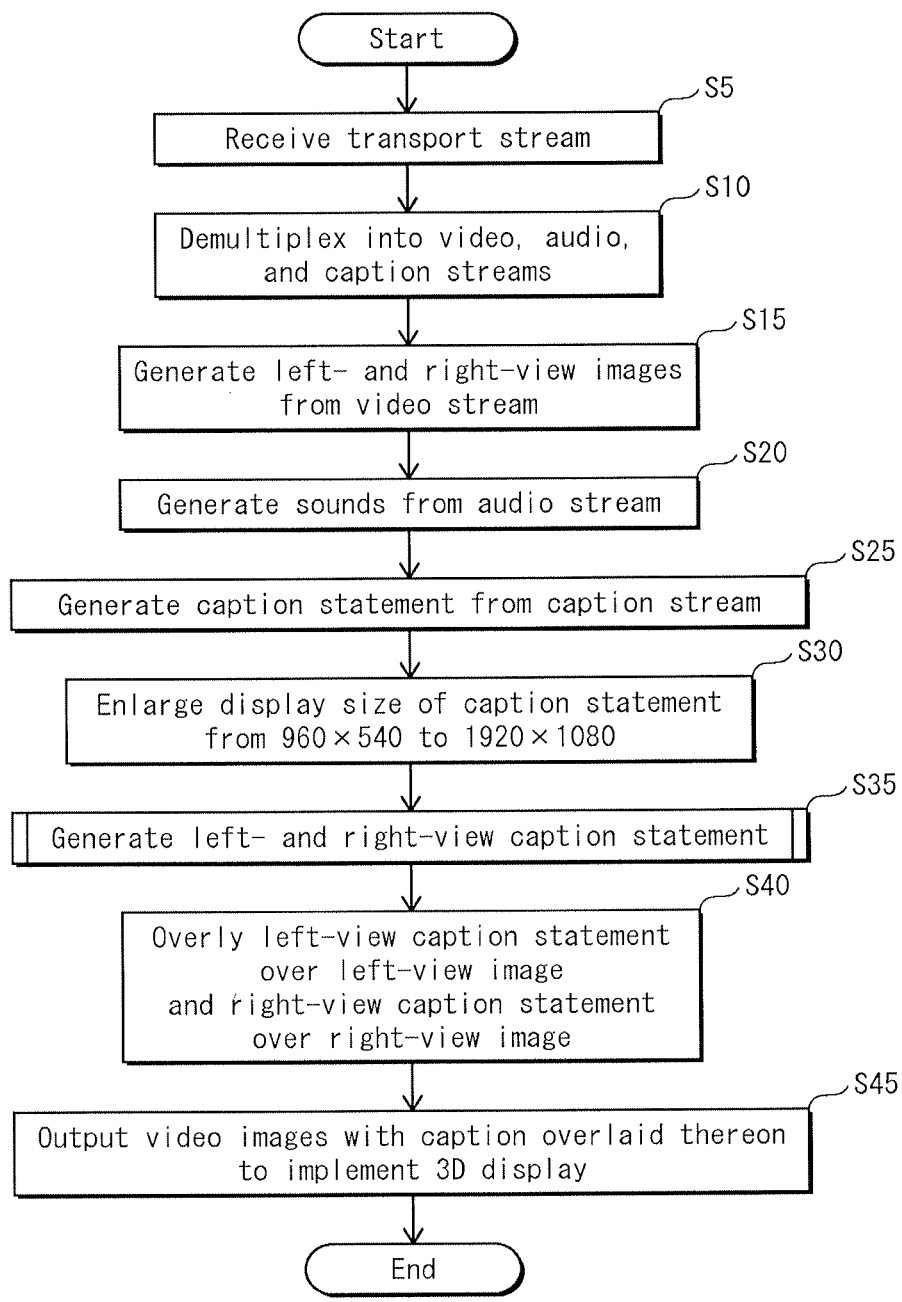
FIG. 20 is a flowchart of the overall processing of the video processing device 1200.

The following describes the overall operation of the video processing device 1200 from the receipt of a transport stream to the presentation of 3D display, with reference to the flowchart shown in FIG. 20.

The receiver 1201 of the video processing device 1200 receives a transport stream (Step S5).

The demultiplexer 1202 separates the transport stream received by the receiver 1201 into video, audio, and caption streams (Step S10).

The 3D video decoder 1203 generates left- and right-view images from the video stream and writes the left-view image to the left-view image plane 1206 and the right-view image to the right-view image plane 1207 (Step S15). For example, the 3D video decoder 1203 decodes the video stream into left- and right-view images.

The audio decoder 1205 generates sounds from the audio stream to output the sounds (Step S20).

The caption decoder 1204 generates a caption statement from the caption stream and writes the caption statement to the caption buffer 1208 (Step S25).

The size converter 1209 scales the caption statement image, which corresponds to one screen, stored in the caption buffer 1208 from the original size (960×540) to the size defined for the left- and right-view images (1920×1080) by enlarging the caption statement image by the predetermined factor (twice both vertically and horizontally) and writes the enlarged caption image to the caption plane 1210 (Step S30).

The caption processing unit 1211 performs the process of generating left- and right-view caption statements (Step S35).

The output processor 1212 performs, in timed relation with the output of the respective video images, the process of overlaying caption statement and video images with the use of the compositing units 1232 and 1233 (Step S45). More specifically, the output processor 1212 overlays the left-view image stored on the left-view image plane 1206 and the left-view caption statement generated by the caption processing unit 1211 and also overlays the right-view image stored on the right-view image plane 1207 and the right-view caption generated by the caption processing unit 1211. The output processor 1212 then outputs the images resulting from the overlaying to implement 3D display (Step S45).

(2) Process of Generating Left- and Right-View Caption Statements

The following describes the details of the process of generating the left- and right-view caption statements in Step S35 of FIG. 20. In the description, reference is made to the flowchart shown in FIG. 21.

The determiner 1221 of the caption processing unit 1211 determines whether the offset value to be used for generating the left- and right-view caption statements is a fixed value or not, based on the value held in the type information D101 of the reference information D100 received from the caption decoder 1204 (Step S100). More specifically, the determiner 1221 determines that a fixed value is to be used when the value held in the type information D101 is "00" and that a reference value is to be used when the value is "01".

When the determiner 1221 determines that a fixed value is to be used (Step S100: Yes), the offset value specifier 1222 acquires the fixed value from the reference information D102 included in the offset reference information D100 (Step S105).

When the determiner 1221 determines that a reference value rather than a fixed value is to be used (Step S100: No), the offset value specifier 1222 acquires the reference value, which in this case indicates an offset sequence ID, from the reference information D102 included in the offset reference information D100 (Step S110) and then acquires the value corresponding to the offset sequence ID (Step S115).

The left-view caption generator 1223 generates a left-view caption statement from the caption statement the image stored on the caption plane 1210 by applying the offset value acquired in Step S105 or Step S115 (Step S120).

The right-view caption generator 1224 generates a right-view caption statement from the caption statement image stored on the caption plane 1210 by applying the offset value acquired in Step S105 or Step S115 (Step S125).

(3) Operation of Transmitter Device 1300

Figure 22:
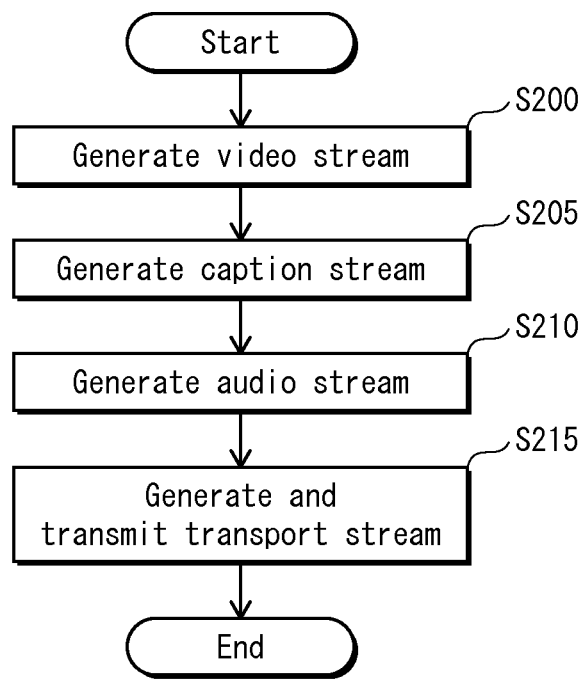
FIG. 22 is a flowchart of the processing by the transmitter device 1300.

The following describes the operation of the transmitter device 1300 with reference to the flowchart shown in FIG. 22.

The video encoder 1301 encodes video access units (pictures) seen from multiple viewpoints to generate a video stream and writes the video stream into the video stream storage 1304 (Step S200).

The caption encoder 1302 encodes one or more pieces of caption management data and one or more pieces of caption statement data to generate a caption stream and writes the caption stream into the caption stream storage 1305 (Step S205). The caption statement data subjected to encoding by the caption encoder 1302 has the data construction shown in FIG. 15. That is, the offset reference information is included subsequently to the caption statement data.

The audio encoder 1303 generates an audio stream by encoding to compress audio data and write the audio stream into the audio stream storage 1306 (Step S210).

The multiplexer 1307 multiplexes video, caption, and audio streams, SI, and so on into an MPEG2 transport stream and transmits the transport stream via the transmitter 1308 (Step S215).

2.8 Modifications

Up to this point, the description has been given based on the first embodiment. However, the present invention is not limited to the specific embodiment described above. Various modifications including the following may be made.

(1) In the above description, the offset reference information is defined in the data construction of the caption statement data. However, the present invention is not limited to such.

Figure 23:
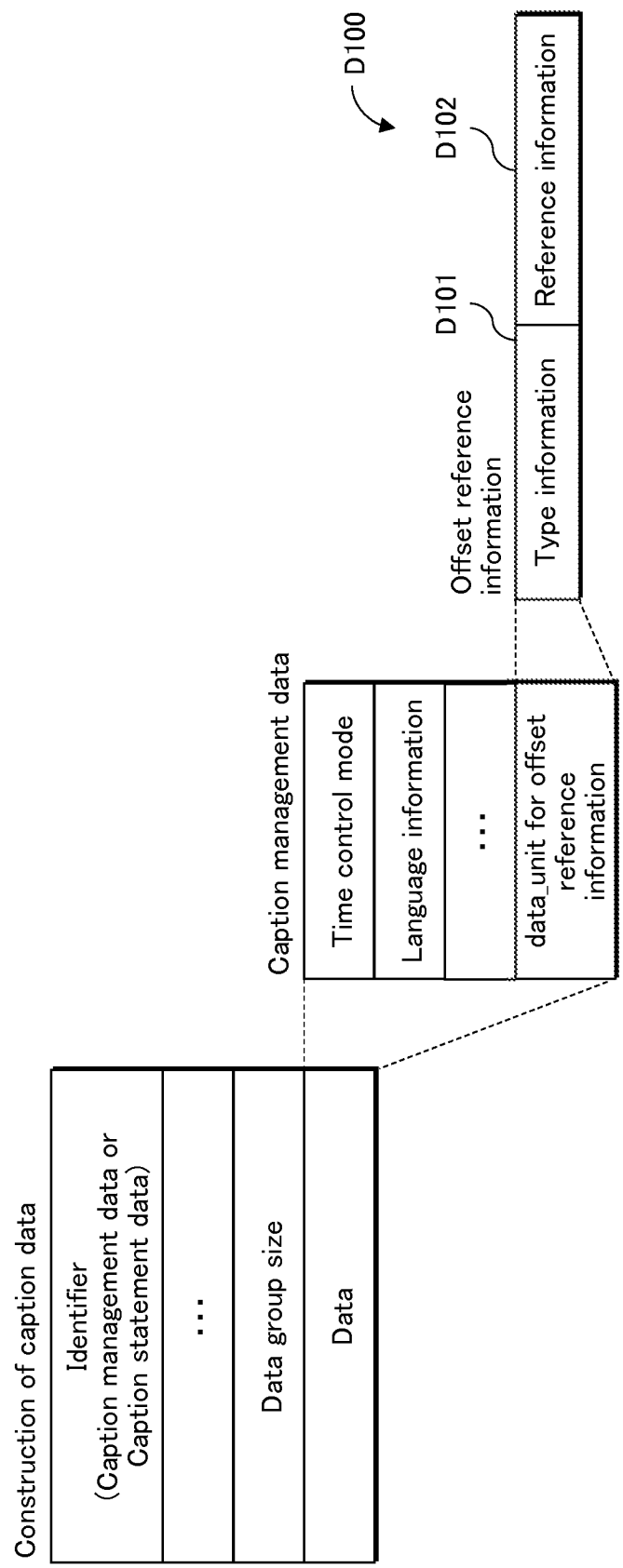
FIG. 23 illustrates the construction of caption management data that includes offset reference information.

The offset reference information may be defined in the caption management data as shown in FIG. 23.

Figure 24:
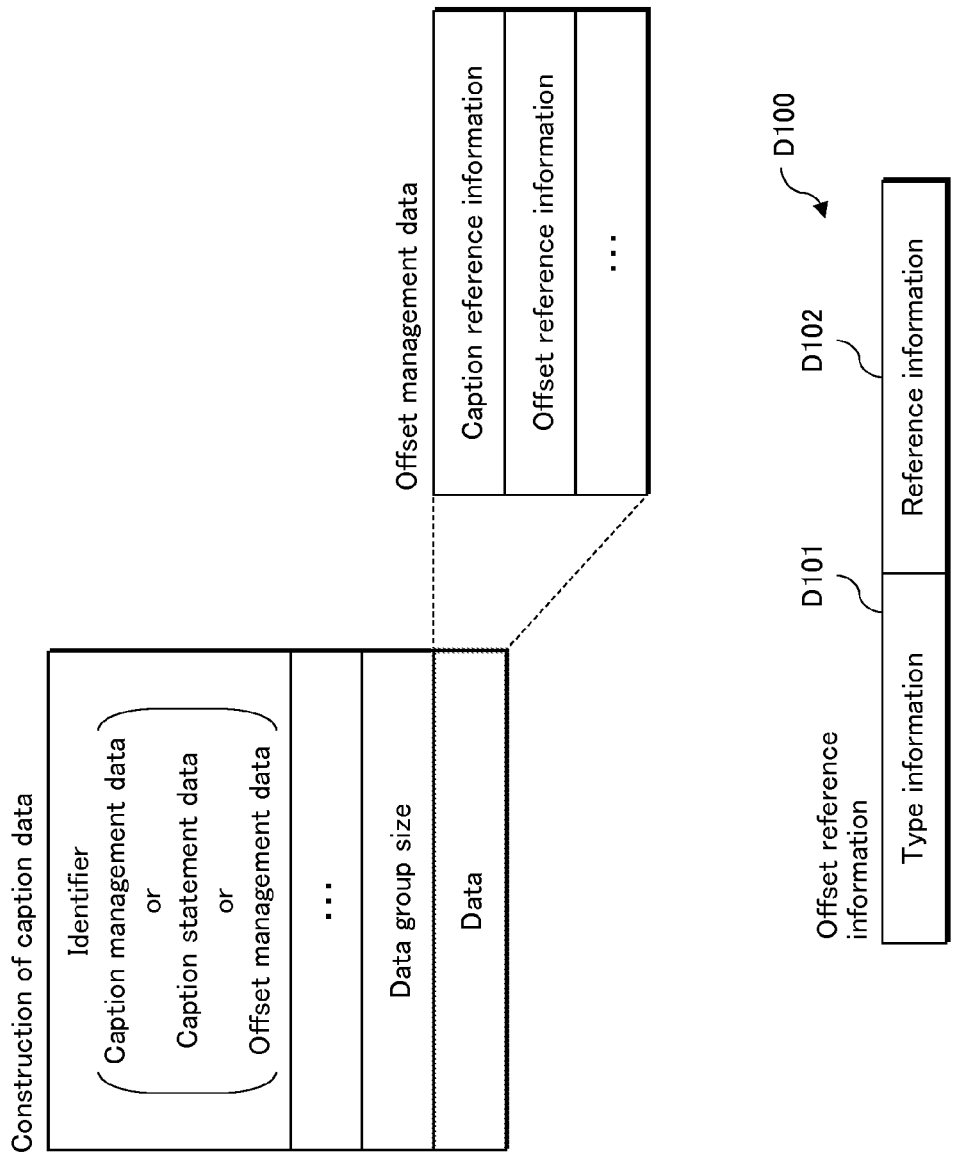
FIG. 24 illustrates the construction of caption data that includes offset management data.

Alternatively, the offset reference information may be defined as data (offset management data) included in the caption data construction but separately from the caption statement data and caption management data, as shown in FIG. 24. In this modification, the identifier "data_group_id" that indicates the type of the caption data is set to a new value assigned to the offset management data. The offset management data further includes caption reference information and offset reference information. The caption reference information stores the identifier identifying the caption statement to which the offset reference information that follows the caption reference data is to be applied. Since the offset reference information has already been described, no further description is given here.

Figure 25:
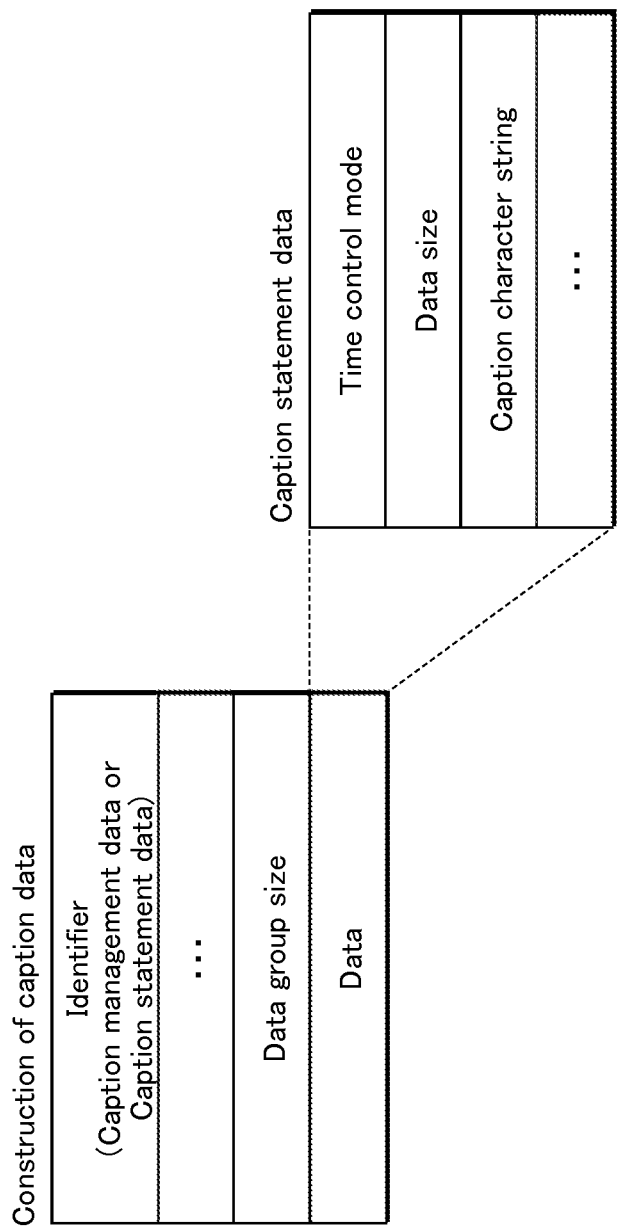
FIG. 25 illustrates a caption character string that includes offset reference information.

As a yet another alternative shown in FIG. 25, the type information and reference information may be included in the special code sequence that defines the caption character string included in the caption statement data.

In a yet another alternative, the type information alone may be newly added to the PMT as a descriptor or stream information or it may be added to EIT. In short, the type information may be included in the SI. In this modification, the reference information may be included in any of the caption statement data, caption management data, offset management data, and the special code sequence that defines the caption character string. When the type information indicates the use of a fixed value, the fixed value may also be stored in the PMT with the type information.

(2) In the embodiment described above, the video offset information is provided for each video access unit and included in supplementary data of the video access unit. However, the present invention is not limited to such.

Figure 26:
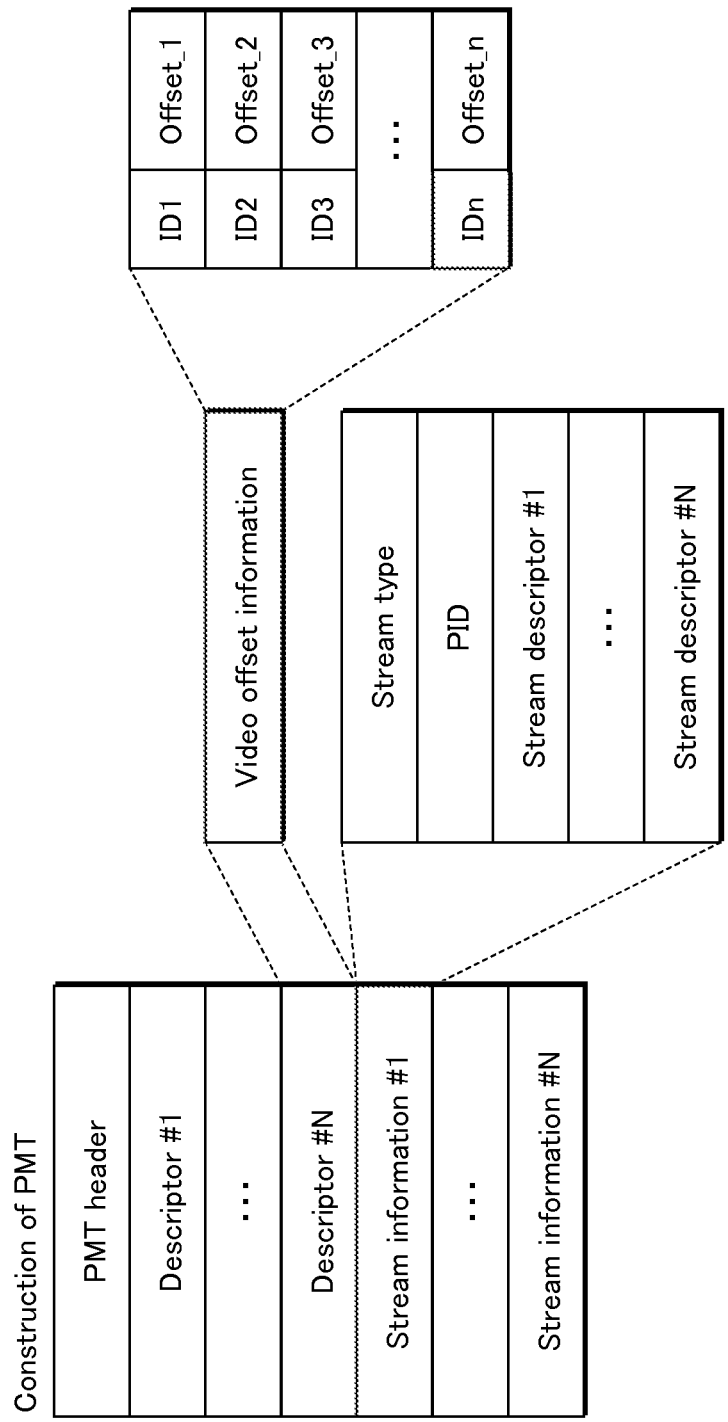
FIG. 26 illustrates a PMT that includes video offset information.

The video offset information may be included in the PMT. For example, as shown in FIG. 26, the descriptor #N may be used to define a table associating the offset values (Offset_1, Offset_2, ... Offset_n) with the respective identifiers (ID1, ID2, ... IDn).

In short, the video offset information may be provided for each picture or for each set of pictures.

(3) The embodiment described above may be combined with one or more modifications.

3. Second Embodiment

The following describes the configuration of a video processing device 2200 according to the second embodiment.

The video processing device 1200 according to the first embodiment generates both left- and right-view caption statements from the same caption statement image. However, the video processing device 2200 according to the present embodiment receives separate images for left- and right-view caption statements from the transmitter device 1300 to implement 3D display of captions.

The following description of the present embodiment will focus on differences from the first embodiment.

3.1 Configuration of Video Processing Device 2200

The following describes the configuration of the video processing device 2200.

Figure 27:
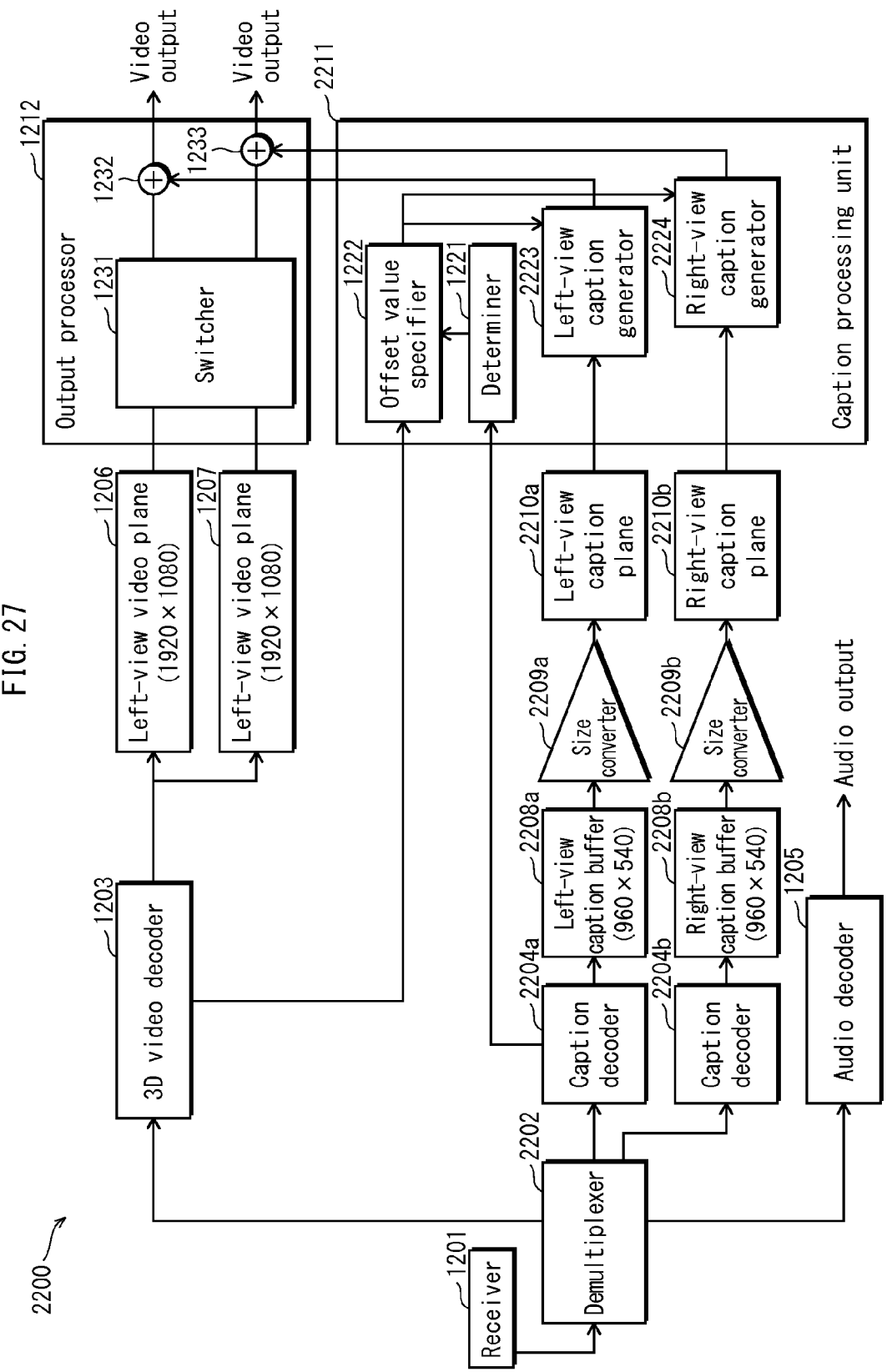
FIG. 27 is a block diagram of the construction of a video processing device 2200.

As shown in FIG. 27, the video processing device 2200 includes a receiver 1201, a demultiplexer 2202, a 3D video decoder 1203, caption decoders 2204a and 2204b, an audio decoder 1205, a left-view image plane 1206, a right-view image plane 1207, a left-view caption buffer 2208a, a right-view caption buffer 2208b, size converters 2209a and 2209b, a left-view caption plane 2210a, a right-view caption plane 2210b, a caption processing unit 2211, and an output processor 1212.

Since the first embodiment has already described the receiver 1201, the 3D video decoder 1203, the audio decoder 1205, the left-view image plane 1206, the right-view image plane 1207, and the output processor 1212, such description is not repeated here.

(1) Demultiplexer 2202

The demultiplexer 2202 is, for example, a demultiplexer circuit and separates the transport stream received from the receiver 1201 into video, audio, caption streams and outputs the resulting streams to the respective decoders. In this embodiment, the caption streams generated by the demultiplexing differ from that described in the first embodiment.

Figure 28:
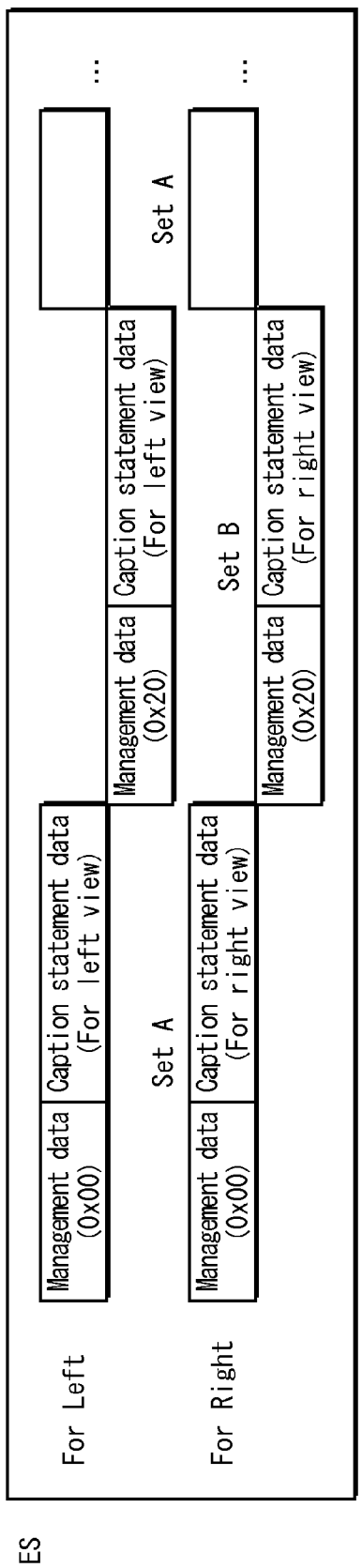
FIG. 28 illustrates an elementary stream including both a left-view caption stream and a right-eye caption stream.

FIG. 28 illustrates the schematic construction of an elementary stream (ES) containing caption streams according to the present embodiment. One ES contains both left- and right-view caption statement data. As shown in FIG. 29, the possible values of the data group identifier (data_group_id) additionally include new values (0x41 to 0x48 and 0x61 to 0x68) for identifying the right-view caption data (right-view caption statement data). For identification of the left-view caption data (left-view caption statement data), the conventionally assigned values (0x1 to 0x8 and 0x21 to 0x28) are used. Within the ES, the value assigned to a set A and the value assigned to a set B are alternately used. In addition, the left-view caption statement data includes a caption character string and offset reference information as shown in FIG. 15. The offset reference information is not included in the right-view caption statement data. In other words, the right-view caption statement data has the data construction shown in FIG. 8.

Similarly to the first embodiment, the video offset information according to the present embodiment is provided for each video access unit and included in supplementary data of the video access unit.

The demultiplexer 2202 outputs the caption streams obtained by demultiplexing. In particular, the left-view caption management data and caption statement data are output to the caption decoder 2204a, and the right-view caption management data and caption statement data are output to the caption decoder 2204b.

(2) Caption Decoder 2204a

The caption decoder 2204a decodes the data received from the demultiplexer 2202 into left-view caption statement data and writes a caption statement (left-view caption statement) included in the left-view caption statement data to the left-view caption buffer 2208a.

The caption decoder 2204a outputs the offset reference information to the caption processing unit 2211.

(3) Caption Decoder 2204b

The caption decoder 2204b decodes the data received from the demultiplexer 2202 into right-view caption statement data and writes a caption statement (right-view caption statement) included in the right-view caption statement data to the right-view caption buffer 2208b.

(4) Left-View Caption Buffer 2208a

The left-view caption buffer 2208a is a buffer for storing a left-view caption statement, which corresponds to one screen, generated by the caption decoder 2204a. The size of the left-view caption buffer 2208a is 960×540.

(5) Right-View Caption Buffer 2208b

The right-view caption buffer 2208b is a buffer for storing a caption statement, which corresponds to one screen, generated by the caption decoder 2204b. The size of the right-view caption buffer 2208b is 960×540.

(6) Size Converter 2209a

The size converter 2209a scales the left-view caption statement, which corresponds to one screen, stored in the left-view caption buffer 2208a from its original size (960×540) to the size of left-view images (1920×1080) by enlarging it by a predetermined factor (twice both vertically and horizontally). The specific details for the caption enlargement is the same as was described in the first embodiment.

(7) Size Converter 2209b

The size converter 2209b scales the right-view caption statement, which corresponds to one screen, stored in the right-view caption buffer 2208b from its original size (960×540) to the size of right-view images (1920×1080) by enlarging it by a predetermined factor (twice both vertically and horizontally). The specific details for the caption enlargement is the same as was described in the first embodiment.

(8) Left-View Caption Plane 2210a and Right-View Caption Plane 2210b

The left-view caption plane 2210a is memory capable of storing pixel data which corresponds to one screen line by line and used to store the pixel data representing an image of the left-view caption statement scaled to the size 1920×1080 by the size converter 2209a. The pixel data stored in the caption plane 2210a is output according to horizontal and vertical synchronization signals.

The right-view caption plane 2210b is memory capable of storing pixel data which corresponds to one screen line by line and used to store the pixel data representing an image of right-view caption statement scaled to the size 1920×1080 by the size converter 2209b. The pixel data stored in the right-view caption plane 2210b is output according to horizontal and vertical synchronization signals.

(9) Caption Creating and Processing Unit 2211

The caption processing unit 2211 applies the offset value to each of the left- and right-view caption statements stored on the left- and right-view caption planes 2210a and 2210b, respectively to generate a pair of parallax images. Note that the offset value to be applied is determined according to the instruction given from the source of the video images.

As shown in FIG. 27, the caption processing unit 2211 includes a determiner 1221, an offset value specifier 1222, a left-view caption generator 2223, and a right-view caption generator 2224.

Since the first embodiment has already described the determiner 1221 and the offset value specifier 1222, such description is not repeated here.

(9-1) Left-View Caption Generator 2223 and Right-View Caption Generator 2224

The left-view caption generator 2223 shifts the left-view caption statement image stored on the left-view caption plane 2210a by the amount indicated by the offset value, and the right-view caption generator 2224 shifts the right-view caption statement image stored on the right-view caption plane 2210b by the amount indicated by the offset value.

More specifically, the left-view caption generator 2223 adds the offset value received from the offset value specifier 1222 to the horizontal coordinates of the pixels stored on the left-view caption plane 2210a to create a left-view caption statement image with offset. The thus created left-view caption statement image with offset is output to the output processor 1212. Similarly, the right-view caption generator 2224 subtracts the offset value received from the offset value specifier 1222 from the horizontal coordinates of the respective pixels stored on the right-view caption plane 2210b to create a right-view caption statement image with offset. The thus created right-view caption statement image with offset is output to the output processor 1212.

3.2 Configuration of Transmitter Device

The configuration of the transmitter device is basically the same as that of the transmitter device 1300 according to the first embodiment, except that the transmitter device according to the present embodiment generates an ES to include both left-view caption statement data and right-view caption statement data.

The other functions of the transmitter device are the same as were described in the first embodiment. Therefore, such a description is omitted here.

3.3 Operation (1) Overall Operation of Processing Device 2200

The overall processing of the video processing device 2200 differs from the first embodiment in Steps S25 and S30 shown in FIG. 20. More specifically, Step S25 is carried out by each of the caption decoders 2204a and 2204b, and Step S30 is carried out by each of the size converters 2209a and 2209b. However, the concept underlying each processing remains the same, and therefore the description is not repeated here.

(2) Process of Generating Left- and Right-View Caption Statements

Figure 21:
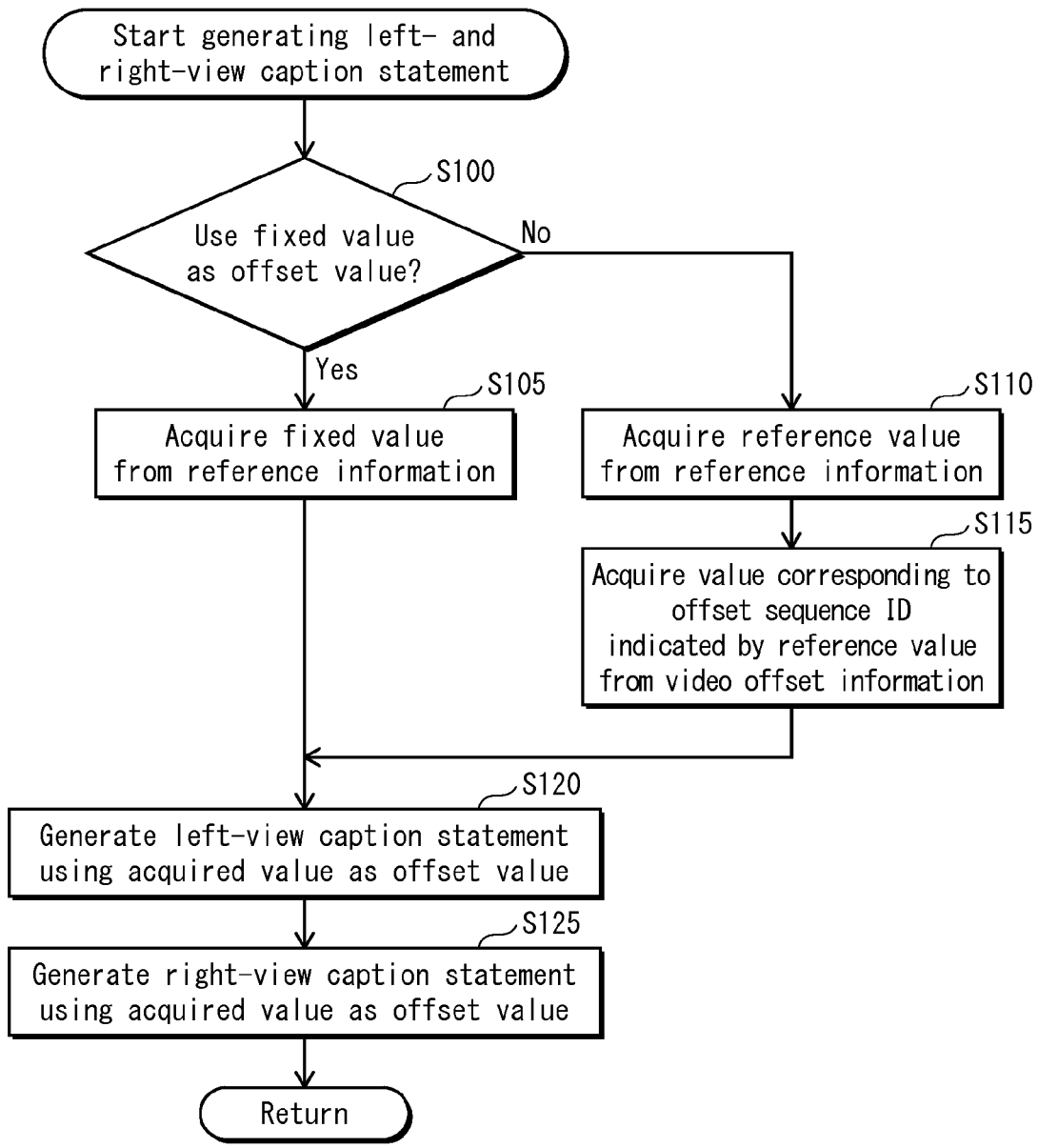
FIG. 21 is a flowchart of a process of generating a left-view caption statement and a right-view caption statement.

The process of generating left- and right-view caption statements according to the second embodiment differs from the first embodiment in that the left-view caption generator 2223 uses the left-view caption plane 2210a in Step S120 shown in FIG. 21 and that the right-view caption generator 2224 uses the right-view caption plane 2210b in Step S125. However, the concept underlying each processing remains the same and therefore the description is not repeated here.

(3) Operation of Transmitter Device

The operation of the transmitter device according to the second embodiment differs from the first embodiment in that Step S205 shown in FIG. 22 involves the coding of an elementary stream carrying both left- and right-view caption statement data. However, the concept underlying each processing remains the same and therefore the description is not repeated here.

3.4 Modifications

Up to this point, the description has been given based on the second embodiment. However, the present invention is not limited to the specific embodiment. Various modifications including the following may be applicable.

(1) In the above description, the offset reference information is defined in the data construction of the left-view caption statement data. The present invention is not limited to such.

The offset reference information may alternatively be defined in the right-view caption statement data.

Alternatively, the offset reference information may be defined in the left-view caption management data or in the right-view caption management data. Alternatively, additional data (offset management data) may be provided to define the offset reference information. Since the data construction of offset management data has been described in the first embodiment, the description is not repeated here.

Alternatively, the type information and reference information may be included in the special code sequence that defines the caption character string included either in the left- or right-view caption statement data.

In a yet another alternative, the type information alone may be added to the PMT as descriptor or stream information or it may be added to EIT. In short, the type information may be included in the SI. In this modification, the reference information may be included in the special code sequence that defines the caption character string included in any of the left-view caption statement data, right-view caption statement data, left-view caption management data, right-view caption management data, offset management data, or special code sequence that defines the caption character string. When the type information indicates the use of a fixed value, the fixed value may also be stored in the PMT with the type information.

(2) In the second embodiment described above, the video offset information is provided for each video access unit and included in supplementary data of the video access unit. However, the present invention is not limited to such. Similarly to the first embodiment, the video offset information may be included in the data construction of the PMT.

(3) According to the second embodiment described above, the left- and right-view caption statement data is both included in the same ES. However, the present invention is not limited to such.

As illustrated in FIG. 30, the left- and right-view caption statement data may be separately stored into different elementary streams ES1 and ES2.

(4) According to the second embodiment described above, the two caption decoders 2204a and 2204b are used to generate left- and right-view caption statements. However, the present invention is not limited to such.

One caption decoder may be commonly used to render the left- and right-view caption statements on the respective caption planes by appropriately switching the input and output of caption data.

(5) According to the second embodiment, the offset value is used to shift both the left- and right-view caption statements to present the richer depth perception in 3D display. However, the present invention is not limited to such.

In one alternative, the left- and right-view caption statements may be overlaid over the left- and right-view images, respectively, without applying the offset values. Even without offset, the left- and right-view caption statements may still be presented in 3D by appropriately adjusting the display positions of the respective caption planes.

(6) According to the second embodiment, the data group identifier identifying the left-view caption statement data is common with the data group identifier identifying caption statement data for conventional 2D video images as shown in FIG. 29. However, the present invention is not limited to such.

A new data group identifier may be assigned to left-view caption statement data, and the data group identifier identifying the right-view caption statement data may be the one common with caption statement data for conventional 2D video images.

Alternatively, new data group identifiers may be assigned to both left- and right-view caption statements.

(7) The embodiment described above may be combined with one or more of modifications.

4. Other Modifications

In addition to the embodiments and modifications described above, other modifications including the following are possible.

(1) According to each embodiment described above, when an offset value is indicated with the use of a reference value, the reference value indicates the offset sequence ID held in the reference information D102 of the offset reference information D100. The offset sequence ID is associated with a specific value to be used as the offset value. However, the present invention is not limited to such.

For example, the reference value (offset value) may be associated with a presentation time. An example of the data construction for such video offset information is shown in FIG. 31A.

Figure 31A:
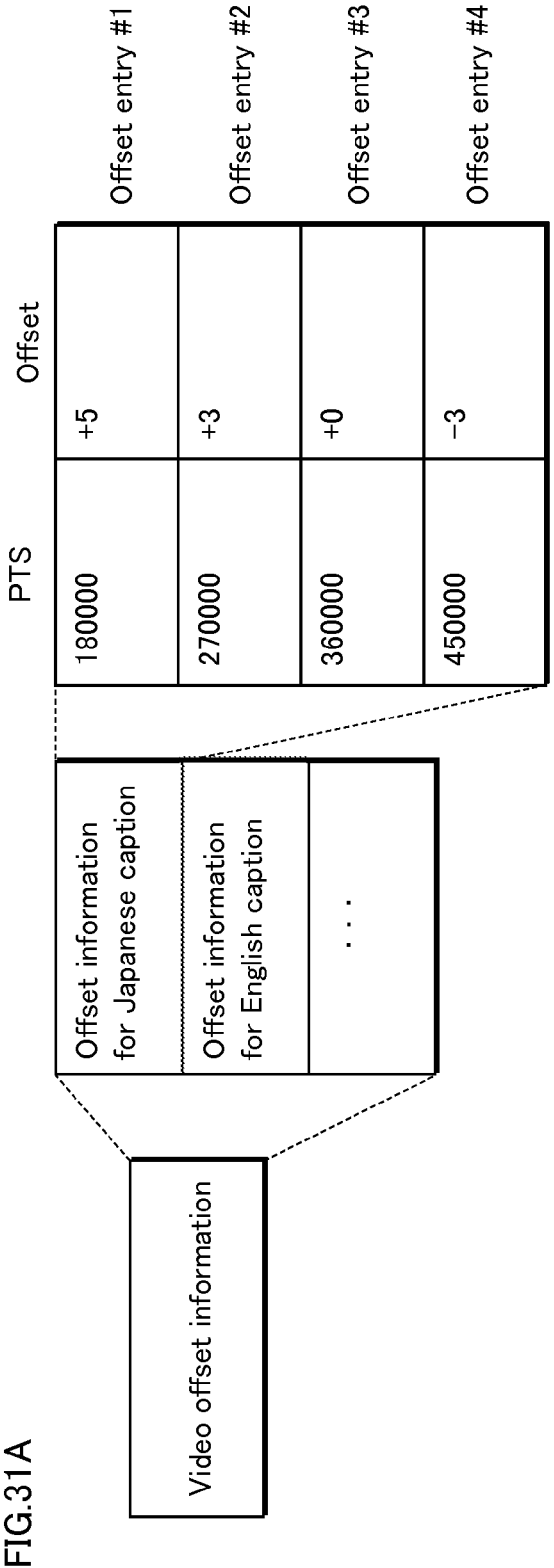
FIGS. 31A and 31B illustrate offset values associated with playback times.

As shown in FIG. 31A, the video offset information includes different pieces of offset information for different languages, namely, offset information for Japanese caption, offset information for English, and so on.

Figure 31B:
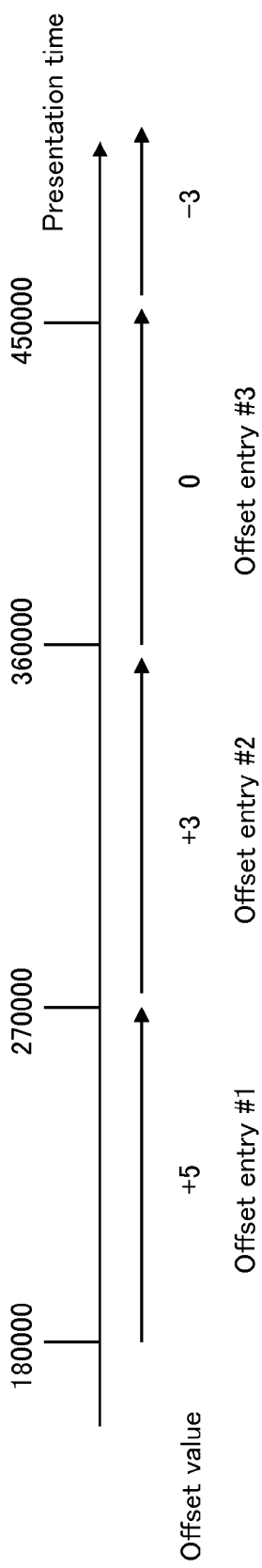

The table information defines a table storing a plurality of pairs of a PTS of a video image and an offset value. In this description, the pair composed of a PTS and offset value is referred to as an offset entry. As shown in FIG. 31B, each offset entry is valid for the section staring from a PTS in that offset entry to the PTS in the subsequent offset entry. For example, the offset value (+5) included in the offset entry #1 is valid from the PTS (180000) of the offset entry #1 to the PTS (270000) of the offset entry #2.

For example, when the reference value is determined to be used as the offset value, the offset value specifier 1222 specifies the offset value to be used based on the presentation time (PTS) of the video images and the table information. Note that when the reference value is used as the offset value, the reference information D102 in the offset reference information D100 is not referenced. Therefore, the reference information D102 may be left blank or store some value.

(2) According to the above embodiments, the video offset information is provided in each video access unit (picture). However, the present invention is not limited to such.

Similarly to the offset information for BD-ROM, the video offset information for all data in the GOP (Group of Pictures) may be collectively provided. For example, the video offset information may be provided in the video access unit located at the head of the GOP so that the video offset information is applied to the other video access units in the same GOP.

(3) As in the case of live broadcasting, it may be crucial if the data sending is delayed for a few frames due to the time taken for determination of whether to use a fixed value, computation of an appropriate reference value (offset information) and generation of offset reference information when the reference value is to be used. In such a case, the offset value per se may be stored for each picture.

(4) In the embodiments described above, one piece of video offset information is provided for one display screen. However, the present invention is not limited to such.

Figure 32:
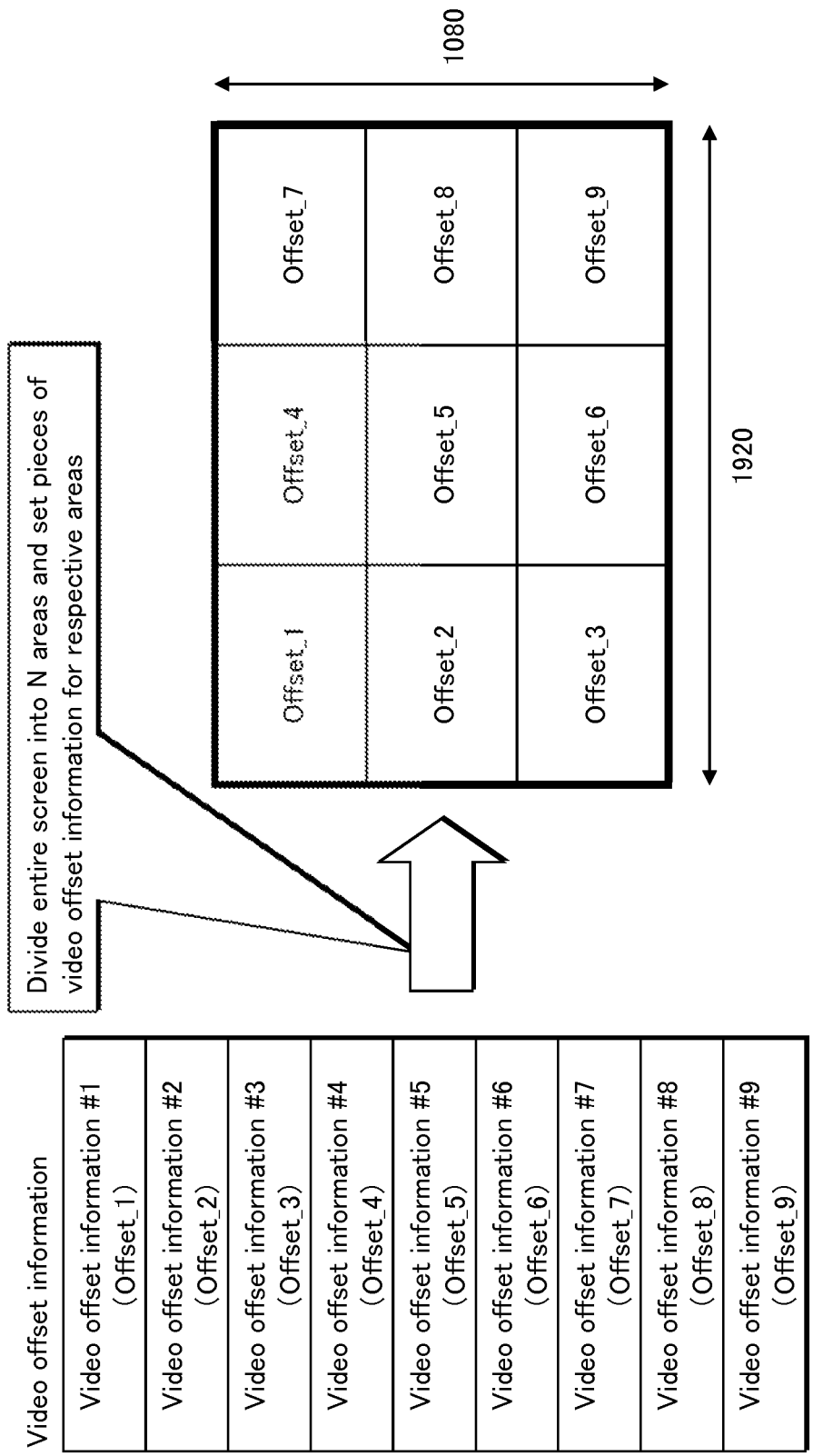
FIG. 32 illustrates pieces of video offset information assigned to respective areas divided from one screen area.
Figure 33:
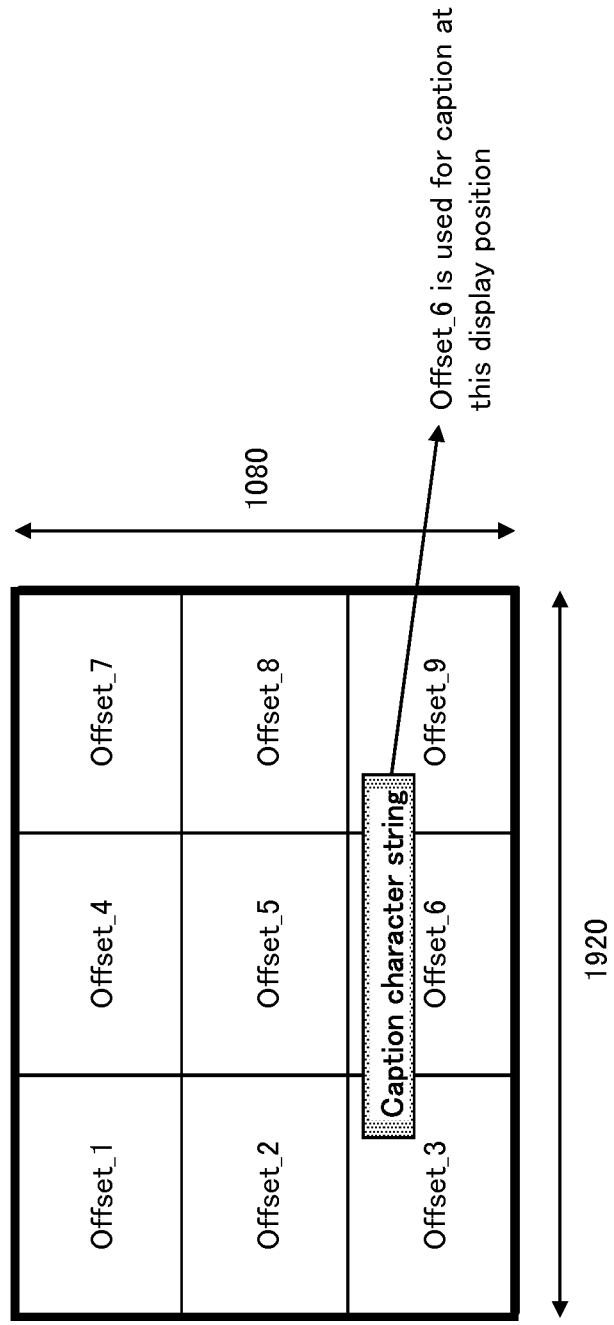
FIG. 33 illustrates the relation between a caption display position and a piece of video offset information to be employed.
Figure 34:
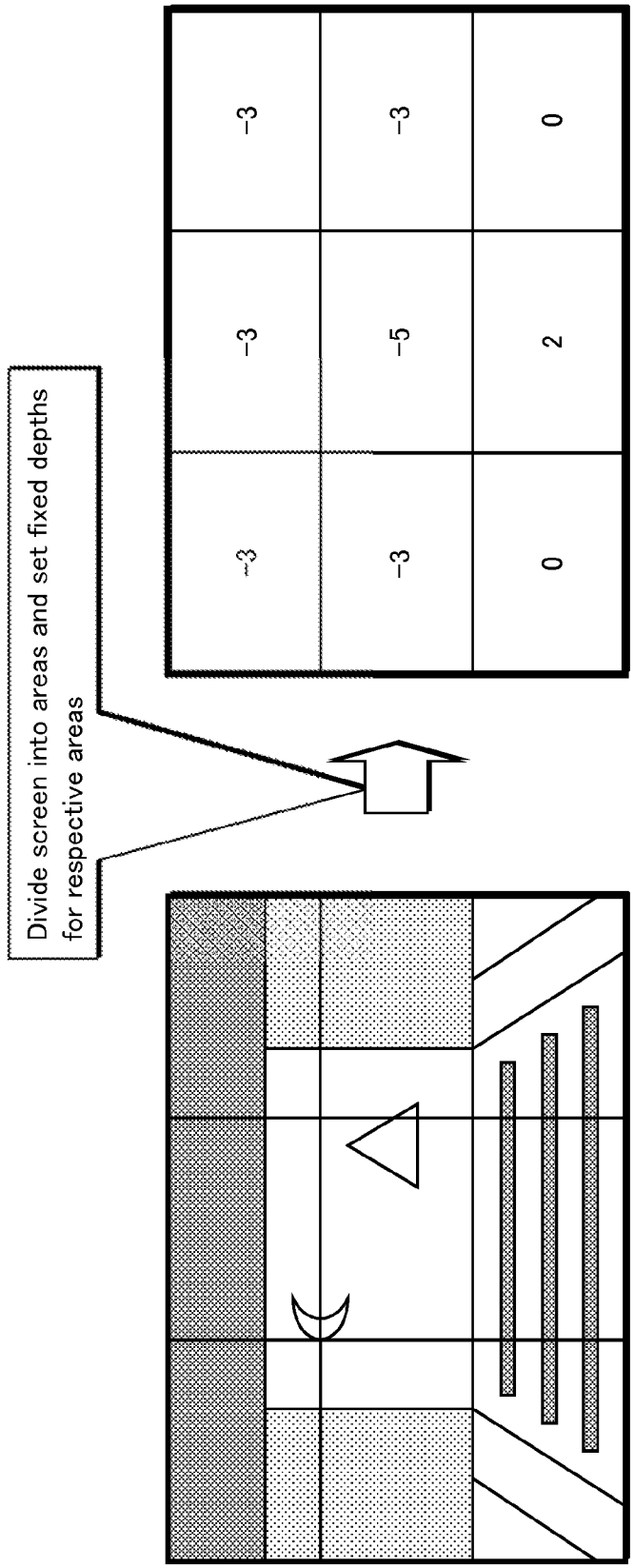
FIG. 34 illustrates pieces of video depth information assigned to respective areas divided from one screen area.

As shown in FIG. 32, one display screen may be divided into a plurality of areas (nine areas in this example) and a piece of video offset information may be associated with each area. Suppose, for example, that a reference value is determined to be used as the offset value. Then, the offset value specifier 1222 specifies areas overlapping with the display position of the caption statement and refers to the video offset information associated with each specified area to acquire the value (offset value) corresponding to the offset sequence ID shown by the reference information D102 of the offset reference information D100. More specifically, as shown in FIG. 33, when the display position of captions overlaps with the three areas along the bottom out of the nine areas, the offset value specifier 1222 selects one of the three areas and acquires an appropriate offset value from the video offset information of the thus selected area (video offset information #6, in this example).

Alternatively, a different video offset value may be set for each usage of the captions to be displayed. For example, the video offset information #1 is assigned to the Japanese captions, video offset information #2 is to captions of the dialog dubbing in Japanese, and video offset information #3 to the English captions.

(5) In some broadcast programs, typified by broadcast relayed from a theater, the camera angle, screen composition, and depth information remain unchanged throughout the entire broadcast program. If the reference value is used in such a broadcast program, one display screen may be divided into a plurality of areas (nine in this example), and each area may be associated with a piece of depth information rater than with video offset information.

The depth information of each area is managed in a depth map. The depth map is a collection of numeric data indicating a binocular parallax computed for each area of the display screen. The numeric data for each area is computed by analyzing the right- and left-view images for each video access unit (picture) with the use of motion compensation performed at the time of video encoding thereby to obtain the difference between the right- and left-view images for each macroblock.

When a reference value is determined to be used, the offset value specifier 1222 computes the offset value using the following expression:

$$\text{Offset} = \text{MaxVideoOffset}(\text{DepthMap}, \text{inTC}, \text{outTC}, X1, Y1, X2, Y2) + \text{Offset Padding}.$$

In the expression, MaxVideoOffset denotes a function for acquiring the depth information of a designated area for a designated caption display period from the depth map. Similarly, inTC and outTC denote the time-codes defining the duration of caption display. Then, X1, X2, Y1, and Y2 denote the position of captions by defining a rectangle area used for displaying captions. The rectangle area has a diagonal connecting points described by (X1, Y1) and (X2, Y2). Finally, Offset Padding denotes a depth value determining the extent to which the captions appear closer than the video images. This value is valid throughout the entire caption display.

(6) According to the embodiments described above, the determiner 1221 refers to the type information D101 to determine whether a fixed value or a reference value is used. However, the present invention is not limited to such.

The determiner 1221 may determine whether the video access unit to be displayed includes video offset information or not. The determiner 1221 determines that a reference value is to be used in the presence of video offset information and that a fixed value is to be used in the absence of video offset information.

(7) The video processing device described in each embodiment is a 3D digital television receiver. However, this is merely one example and without limitation. The video processing device may be a DVD recorder, BD (Blu-ray Disc) recorder, or set-top box.

(8) According to the embodiments described above, it is a caption statement that is overlaid over video images. However, the present invention is not limited to such.

The present invention is applicable to the overlaying of graphics data, such as subtitles.

(9) In the case where the video plane and the caption plane are of equal resolution, the process of size conversion is not necessary. In such a case, providing type information in a transport stream is beneficial for efficient processing of 3D display of captions or the like.

(10) According to the embodiments described above, the type information D101 shown in FIG. 15 indicates whether to use a fixed value throughout the entire 3D program containing a plurality of pictures or to use a variable that holds a value dependent on each video image of the 3D program. However, the present invention is not limited to such.

Both a fixed value and a variable may be used in one 3D program by using, for example, a fixed value for one part of the program and a variable for different part.

This modification makes it possible to use a variable for the main feature in one 3D program (such as a movie itself in a movie broadcast program) and to use a fixed value for specific parts other than the main feature of the 3D program, such as commercials.

(11) Each device described above is specifically a computer system composed of a microprocessor, ROM, RAM, hard disk unit, display unit, keyboard, and mouse. The RAM or hard disk unit stores a computer program. The functionally of each device is implemented by the microprocessor operating according to the computer program. The computer program is a set of instruction codes that directs the computer to perform predetermined functions.

(12) One or more, or all of the components of each device described above may be composed of a single integrated circuit.

(13) One or more, or all of the components of each device described above may be composed of an IC card that may be attached to and detached from the device or of a single module. The IC card or module is a computer system composed of a microprocessor, ROM, RAM, and the like. The IC card or module may include an ultra-multifunctional LSI. The functionally of the IC card or module device is implemented by the microprocessor operating according to the computer program. The IC card or module may be tamper-resistant.

(14) In one aspect of the present invention, the present invention may be practiced as any method described above. Furthermore, the present invention may be practiced as a computer program implementing such a method.

The present invention may be practiced as a computer-readable recording medium storing the computer program. Examples of the computer-readable recoding medium include a flexible disk, hard disk, CD-ROM, MO, DVD, DVD-ROM, DVD-RAM, BD (Blu-ray Disc), and semiconductor memory.

The present invention may also be practiced by transmitting the computer program via an electric telecommunication line, a wired or wireless communication network, a network typified by the Internet, or via data broadcasting.

The present invention may be practiced as a computer system having a microprocessor and memory. The memory stores the computer program mentioned above, and the micro processor operates according to the computer program.

Also, the computer program may be transferred via being recorded on the recording medium mentioned above or via the network or the like mentioned above. Then, the computer program may be executed by another independent computer system.

(15) The above embodiments and modifications may be combined with one another.

5. Conclusion

According to the embodiments described above, the caption statement data contains both the caption statement and the offset reference information corresponding to the caption statement data. As compared to the case where the offset reference information is stored in the caption management data, the video processing device can immediately process the caption statement data using the correctly corresponding offset information for the following reason. That is, upon the start of broadcast reception, the video processing device may receive caption statement data before caption management data. If the offset reference information is stored in the caption management data, the caption statement data is without caption management data until the subsequent caption management data is received. Therefore, appropriately displaying caption statement is not possible until the caption management data is received. However, storing offset reference information in caption statement data allows the video processing device to appropriately display the captions upon receiving caption statement data before caption management data at the start of broadcast reception. This is because the corresponding offset value is received with the caption statement data.

Also, in one preferable order of data units (caption character string and offset reference information) in the caption statement data, the data units carrying caption character string precede the data units carrying offset reference information. This order ensures compatibility with conventional video processing devices not capable of handling the data units carrying offset information, i.e., devices for receiving and displaying 2D video images because such caption statement data ensures the caption character string to be correctly processed by those devices.

In addition, in the case where the offset reference information is stored in the caption management data as shown in FIG. 23, it is preferable to place the video offset reference information in the caption management data rather than in the individual caption statement data under the state where the video offset information to be referenced does not change from one caption to another. This arrangement is effective to avoid unintentional change of the video offset information from one caption to another.

6. Supplementary Explanation (1) According to one aspect of the present invention, a video processing device includes: a receiving unit configured to receive a video stream of 3D video data and a data stream of presentation data to be overlaid over video images generated from the video stream, a display area for the presentation data differing in size from a display area for the video images; a video image generating unit configured to generate left-view images and right-view images from the video stream; an enlarging unit configured to enlarge the presentation data by a predetermined factor so as to scale a display area for the enlarged presentation data to match the display area for the video images; a data generating unit configured to generate left-view presentation data and right-view presentation data by using the enlarged presentation data and an offset value determined to cause a parallax between the left-view presentation data and the right-view presentation data; and a display processing unit configured to overlay the left-view presentation data over the left-view images and the right-view presentation data over the right-view images to display video images resulting from the overlaying.

With this configuration, the video processing device enlarges the presentation data so that the size of the display area is scaled to match the size of the display area for each video image, before generating right- and left-view presentation data using the offset value. This ensures that a pair of left- and right-view presentation data generated by applying a shift according to the offset value becomes suitable presentation data to be overlaid over video images, as the pair of presentation data causes an originally intended parallax.

(2) Optionally, the video images generated from the video stream may constitute one 3D program. The data generating unit may acquire an instruction indicating that the offset value to be used is a fixed value assigned to the 3D program or a variable dependent on each video image of the 3D program, determine the offset value according to the instruction, and generate the left-view presentation data and the right-view presentation data by using the offset value thus determined.

With this configuration, the video processing device can selectively use the fixed value or variable according to the instruction.

(3) Optionally, the video stream may contain table information for each video image constituting the 3D program, the table information including one or more variables and variable specifying information for each of the variables. The data stream may be a caption stream of caption data. One or more pieces of caption statement data constituting the caption stream may each include a caption statement to be displayed and appendix information, the appendix information including either the fixed value or a piece of variable specifying information as indicated by the instruction. When the instruction indicates to use the fixed value assigned to the 3D program, the data generating unit may acquire as the offset value the fixed value from the appending information. When the instruction indicates to use the variable dependent on each video image of the 3D program, the data generating unit may acquire as the offset value the variable specified by the piece of variable specifying information included in the appendix information from the table information.

With this configuration, either a fixed value or variable specifying information is included in the caption statement data. Therefore, the video processing device can specify the offset value to be used upon generation of the caption statement data at the reception start of the respective streams.

(4) Optionally, the appendix information may be placed following the caption statement in the caption statement data. The video processing device may further comprise a caption statement generating unit configured to generate the caption statement data from the caption stream, read the caption statement from the generated caption statement data, and write the caption statement to a predetermined buffer. The data generating unit may acquire the appendix information placed following the caption statement after the caption statement is read and written to the predetermined buffer by the caption statement data generating unit.

With this configuration, the appending information is included in the caption statement data at a position subsequent to the caption statement. Consequently, a device capable of displaying captions in 2D is allowed to correctly analyze the caption statement, although the appendix information cannot be analyzed. That is, since the appendix information is located subsequently to the caption statement in the caption statement data, the compatibility between the video processing device and a conventional 2D display device is ensured.

(5) Optionally, the receiving unit may receive service information (SI) with the video stream and the data stream. The instruction may be included either in data constituting the data stream or in data constituting the SI.

With this configuration, the video processing device can determine the details of the instruction at the time of analyzing the data stream in the case where the instruction is included in the data stream. In the case where the instruction is included in the SI, the video processing device is able to determine the details of the instruction before decoding each stream received.

INDUSTRIAL APPLICABILITY

The present invention is applicable to devices for performing 3D display of data, such as caption statement and subtitles, with a 3D broadcast program.

REFERENCE SIGNS LIST 1100 video processing system
1200, 2200 video processing device
1201 receiver 1202, 2202 demultiplexer
1203 3D video decoder
1204, 2204a, 2204b caption decoder
1205 audio encoder
1206 left-view image plane
1207 right-view image plane
1208 caption buffer
1209, 2209a, 2209b size converter
1210 caption plane
1211, 2211 caption processing unit
1212 output processor
1221 determiner
1222 offset value specifier
1223, 2223 left-view caption generator
1224, 2224 left-view caption generator
1231 switcher
1232, 1233 compositing unit
1300 transmitter device
1301 video encoder
1302 caption encoder
1303 audio encoder
1304 video stream storage
1305 caption stream storage
1306 audio stream storage
1307 multiplexer
1308 transmitter
2208a left-view caption buffer
2208b right-view caption buffer
2210a left-view caption plane
2210b right-view caption plane

The invention claimed is:

1. A video processing device comprising:
a processor; and
a non-transitory computer-readable storage medium having executable instructions stored thereon, which when executed by the processor, cause the video processing device to:
receive a video stream of 3D video data and a data stream of presentation data to be overlaid over video images generated from the video stream, a display area for the presentation data differing in size from a display area for the video images;
generate left-view images and right-view images from the video stream;
enlarge the presentation data by a predetermined factor so as to scale a display area for the enlarged presentation data to match the display area for the video images;
generate left-view presentation data and right-view presentation data by using the enlarged presentation data and an offset value determined to cause a parallax between the left-view presentation data and the right-view presentation data; and
overlay the left-view presentation data over the left-view images and the right-view presentation data over the right-view images to display video images resulting from the overlaying, wherein
the video images generated from the video stream constitute one 3D program,
the executable instructions, when executed by the processor, cause the video processing device to acquire an instruction indicating that the offset value to be used is a fixed value assigned to the 3D program or a variable dependent on each video image of the 3D program, determine the offset value according to the instruction, and generate the left-view presentation data and the right-view presentation data by using the offset value thus determined, the video stream contains table information for each video image constituting the 3D program, the table information including one or more variables and variable specifying information for each of the variables,
the data stream is a caption stream of caption data,
one or more pieces of caption statement data constituting the caption stream each include a caption statement to be displayed and appendix information, the appendix information including either the fixed value or a piece of the variable specifying information as indicated by the instruction, and
when the instruction indicates to use the fixed value assigned to the 3D program, the executable instructions, when executed by the processor, cause the video processing device to acquire, as the offset value, the fixed value from the appendix information, and when the instruction indicates to use the variable dependent on each video image of the 3D program, the executable instructions, when executed by the processor, cause the video processing device to acquire, as the offset value, the variable specified by the piece of the variable specifying information included in the appendix information from the table information.

2. The video processing device according to claim 1, wherein
the appendix information is placed following the caption statement in the caption statement data,
the executable instructions, when executed by the processor, cause the video processing device to:
generate the caption statement data from the caption stream, read the caption statement from the generated caption statement data, and write the caption statement to a predetermined buffer, and
acquire the appendix information placed following the caption statement after the caption statement is read and written to the predetermined buffer.

3. The video processing device according to claim 1, wherein
service information (SI) is received with the video stream and the data stream, and
the instruction is included either in data constituting the data stream or in data constituting the SI.

4. A video processing method to be used by a video processing device for displaying 3D images, the method comprising:
receiving a video stream of 3D video data and a data stream of presentation data to be overlaid on video images generated from the video stream, a display area for the presentation data differing in size from a display area for the video images;
generating left-view images and right-view images from the video stream;
enlarging the presentation data by a predetermined factor so as to scale a display area for the enlarged presentation data to match the display area for the video images;
generating left-view presentation data and right-view presentation data by using the enlarged presentation data and an offset value determined to cause a parallax between the left-view presentation data and the right-view presentation data; and
overlaying the left-view presentation data over the left-view images and the right-view presentation data over the right-view images to display video images resulting from the overlaying, wherein
the video images generated from the video stream constitute one 3D program, the method further comprises acquiring an instruction indicating that the offset value to be used is a fixed value assigned to the 3D program or a variable dependent on each video image of the 3D program, determining the offset value according to the instruction, and generating the left-view presentation data and the right-view presentation data by using the offset value thus determined, the video stream contains table information for each video image constituting the 3D program, the table information including one or more variables and variable specifying information for each of the variables, the data stream is a caption stream of caption data, one or more pieces of caption statement data constituting the caption stream each include a caption statement to be displayed and appendix information, the appendix information including either the fixed value or a piece of the variable specifying information as indicated by the instruction, and in said acquiring, when the instruction indicates to use the fixed value assigned to the 3D program, the fixed value from the appendix information is acquired as the offset value, and when the instruction indicates to use the variable dependent on each video image of the 3D program, the variable specified by the piece of the variable specifying information included in the appendix information from the table information is acquired as the offset value.

* * * * *